United States Patent
Wang et al.

(10) Patent No.: US 7,814,204 B1
(45) Date of Patent: Oct. 12, 2010

(54) METHOD OF AND SYSTEM FOR ANALYZING THE CONTENT OF RESOURCE REQUESTS

(75) Inventors: Wei Wang, San Jose, CA (US); Miguel Gomez, Fremont, CA (US); Liang Liu, San Jose, CA (US); Ricky K. Lowe, Atherton, CA (US); Kiet Tran, Saratoga, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 527 days.

(21) Appl. No.: 10/115,572

(22) Filed: Apr. 1, 2002

Related U.S. Application Data

(63) Continuation-in-part of application No. 10/098,957, filed on Feb. 11, 2002.

(60) Provisional application No. 60/355,922, filed on Feb. 11, 2002.

(51) Int. Cl.
  *G06F 15/173* (2006.01)
  *G06F 17/30* (2006.01)

(52) U.S. Cl. .............. 709/226; 707/781; 709/227; 709/229; 709/238

(58) Field of Classification Search ............ 707/5, 707/7, 3; 709/227, 218
See application file for complete search history.

(56) References Cited

U.S. PATENT DOCUMENTS

| | | | |
|---|---|---|---|
| 4,766,534 A | 8/1988 | DeBenedictis | |
| 5,315,708 A | 5/1994 | Eidler et al. | |
| 5,396,490 A | 3/1995 | White et al. | |
| 5,528,761 A | 6/1996 | Ooba et al. | |
| 5,553,242 A | 9/1996 | Russell et al. | |
| 5,561,807 A | 10/1996 | Verplanken et al. | |
| 5,745,694 A | 4/1998 | Egawa et al. | |
| 5,826,082 A | 10/1998 | Bishop et al. | |
| 5,937,169 A | 8/1999 | Connery et al. | |
| 5,956,721 A * | 9/1999 | Douceur et al. | 707/10 |
| 5,974,518 A | 10/1999 | Nogradi | |
| 6,018,516 A | 1/2000 | Packer | 370/231 |
| 6,044,468 A | 3/2000 | Osmond | 713/201 |
| 6,091,733 A | 7/2000 | Takagi et al. | 370/401 |
| 6,195,703 B1 | 2/2001 | Blumenau et al. | 709/238 |
| 6,208,650 B1 | 3/2001 | Hassell et al. | |

(Continued)

OTHER PUBLICATIONS

Saunders, Stephen et al.; "The Policy Makers"; Data Communicatons; pp. 34-35 and 36-56 (even only).*

(Continued)

*Primary Examiner*—Jacob F Bétit
(74) *Attorney, Agent, or Firm*—Blakely Sokoloff Taylor & Zafman

(57) ABSTRACT

Systems and methods are described for analyzing the content of resource requests. A tokenizer parses the resource request and derives a key therefrom. A database associates values of the key with categories of service. An association engine uses the key to obtain one or more matching entries from the database, and derive therefrom the desired category of service for the resource request. A cookie engine derives cookie information from a cookie located in the resource request. A session engine derives session information from a session identifier located in a handshake message associated with the resource request. The desired category of service, the cookie information, and the session information are each useful for allocating a resource to the resource request.

78 Claims, 22 Drawing Sheets

U.S. PATENT DOCUMENTS

| | | | |
|---|---|---|---|
| 6,212,190 B1 | 4/2001 | Mulligan | |
| 6,233,615 B1 | 5/2001 | Van Loo | |
| 6,247,060 B1 | 6/2001 | Boucher et al. | 709/238 |
| 6,298,380 B1 | 10/2001 | Coile et al. | 709/227 |
| 6,304,906 B1 | 10/2001 | Bhatti et al. | |
| 6,327,622 B1 | 12/2001 | Jindal et al. | |
| 6,341,129 B1 | 1/2002 | Schroeder et al. | |
| 6,363,421 B2 | 3/2002 | Barker et al. | |
| 6,374,300 B2 | 4/2002 | Masters | |
| 6,411,986 B1 | 6/2002 | Susai et al. | |
| 6,442,602 B1* | 8/2002 | Choudhry | 709/218 |
| 6,453,360 B1 | 9/2002 | Muller et al. | |
| 6,480,489 B1 | 11/2002 | Muller et al. | |
| 6,490,281 B1 | 12/2002 | Abler et al. | |
| 6,526,056 B1 | 2/2003 | Rekhter et al. | |
| 6,532,487 B1 | 3/2003 | Perks | |
| 6,549,516 B1 | 4/2003 | Albert et al. | |
| 6,549,961 B1 | 4/2003 | Kloth | |
| 6,606,315 B1 | 8/2003 | Albert et al. | |
| 6,606,316 B1 | 8/2003 | Albert et al. | |
| 6,625,650 B2 | 9/2003 | Stelliga | |
| 6,628,654 B1 | 9/2003 | Albert et al. | |
| 6,633,560 B1 | 10/2003 | Albert et al. | |
| 6,650,641 B1 | 11/2003 | Albert et al. | |
| 6,687,222 B1 | 2/2004 | Albert et al. | |
| 6,704,278 B1 | 3/2004 | Albert et al. | |
| 6,714,985 B1 | 3/2004 | Malagrino et al. | |
| 6,724,767 B1 | 4/2004 | Chong et al. | |
| 6,728,748 B1 | 4/2004 | Mangipudi et al. | |
| 6,735,169 B1 | 5/2004 | Albert et al. | |
| 6,742,045 B1 | 5/2004 | Albert et al. | |
| 6,772,333 B1 | 8/2004 | Brendel | |
| 6,775,692 B1 | 8/2004 | Albert et al. | |
| 6,781,992 B1 | 8/2004 | Rana et al. | |
| 6,788,704 B1 | 9/2004 | Lindsay | |
| 6,836,462 B1 | 12/2004 | Albert et al. | |
| 6,839,811 B2 | 1/2005 | Fujiyama | |
| 6,891,839 B2 | 5/2005 | Albert et al. | |
| 6,937,606 B2 | 8/2005 | Basso et al. | |
| 6,973,097 B1 | 12/2005 | Donzis et al. | |
| 7,065,086 B2 | 6/2006 | Basso et al. | |
| 7,072,981 B1 | 7/2006 | O'Rourke et al. | |
| 2001/0034792 A1 | 10/2001 | Swildens | |
| 2001/0052006 A1 | 12/2001 | Barker et al. | |
| 2001/0055317 A1 | 12/2001 | Kajizaki et al. | |
| 2002/0016856 A1 | 2/2002 | Tallegas et al. | |
| 2002/0087694 A1 | 7/2002 | Daoud et al. | |
| 2002/0129127 A1 | 9/2002 | Romero et al. | |
| 2002/0141401 A1 | 10/2002 | Albert et al. | |
| 2003/0009561 A1 | 1/2003 | Sollee | |
| 2003/0014525 A1* | 1/2003 | DeLima et al. | 709/227 |
| 2003/0093496 A1 | 5/2003 | O'Connor et al. | |
| 2003/0149690 A1* | 8/2003 | Kudlacik et al. | 707/3 |
| 2004/0162901 A1 | 8/2004 | Mangipudi et al. | |
| 2005/0010754 A1 | 1/2005 | Brendel | |
| 2006/0080446 A1 | 4/2006 | Bahl | |

OTHER PUBLICATIONS

Dykstra, P., *Gigabit Ethernet Jumbo Frames: and why you should care*, http://sd.wareonearth.com/~phil/jumbo.html, Dec. 20, 1999.

Hornig, C., *A Standard for the Transmission of IP Datagrams over Ethernet Networks*, Symbolics Cambridge Research Center, Network Working Group RFC: 894, Apr. 1984.

Postel, J. ed., *Internet Protocol—DARPA Internet Program Protocol Specification*; RFC: 791, USC Information Sciences Institute, Sep. 1981.

Postel, J. ed., *Transmission Control Protocol—DARPA Internet Program Protocol Specification*, RFC: 793, USC Information Sciences Institute, Sep. 1981.

Postel, J., *The TCP Maximum Segment Size and Related Topics*, RFC: 879, Information Sciences Institute, Nov. 1983.

Postel, "RFC 792—ICMP," 1981, pp. 1-4.

Mogul et al., "RFC 1191—Path MTU Discovery," 1990, pp. 1-3.

Office Action for U.S. Appl. No. 11/925,621, dated Jul. 6, 2009.

Response to Office Action for U.S. Appl. No. 11/925,621, dated Oct. 6, 2009.

USPTO, "Final Office Action", U.S. Appl. No. 11/925,621, Mailed Jan. 4, 2010, whole document.

* cited by examiner

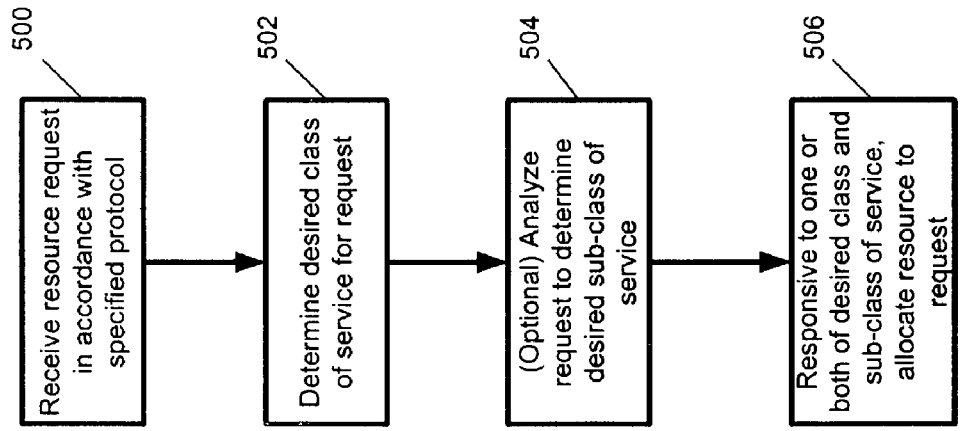

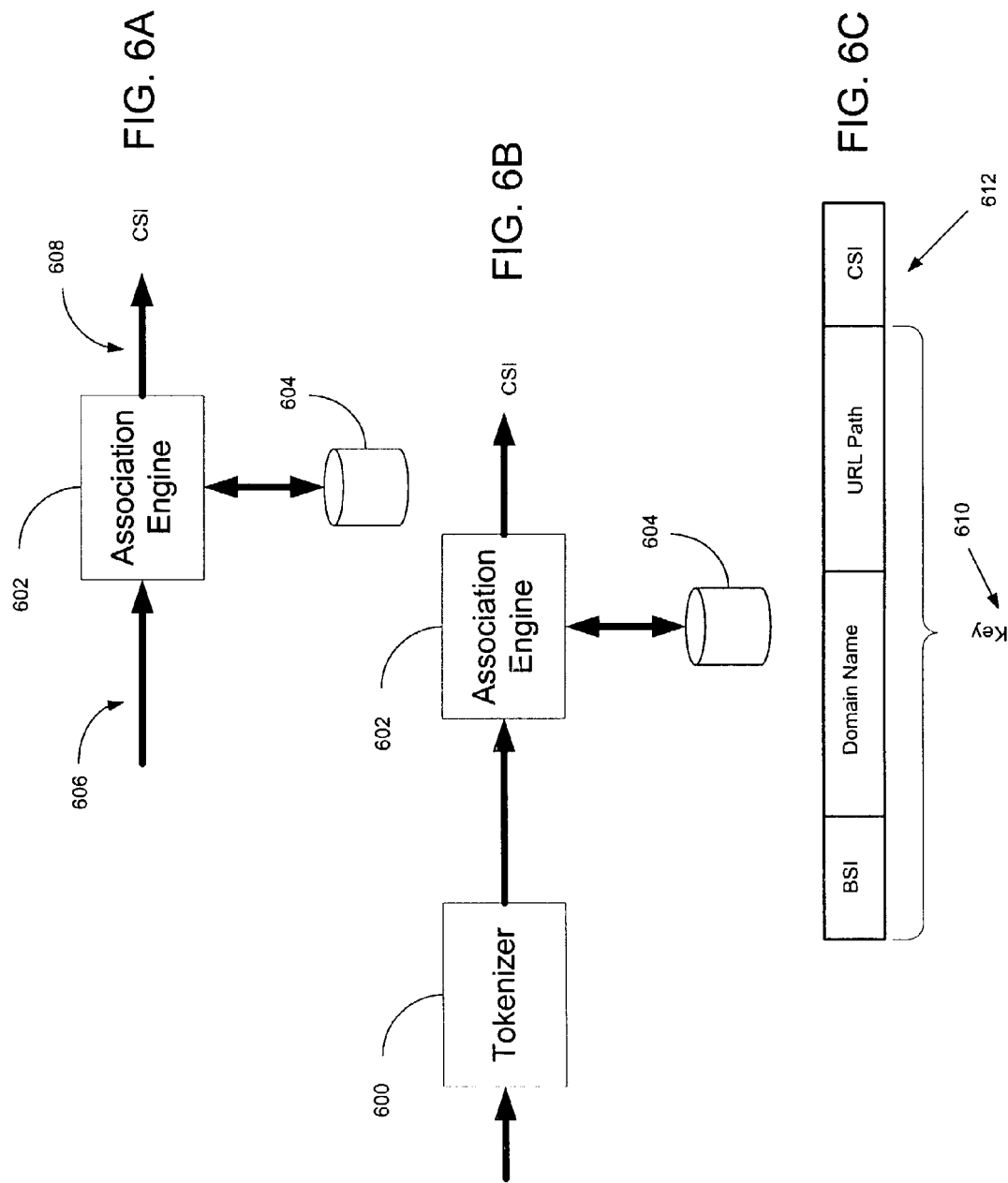

| Items | Supported syntax |
|---|---|
| 1 | ignore empty line with <CR><LF> in the first line of HTTP header |
| 2 | ignore extra <CR><LF> after a HTTP request |
| 3 | support both upper-case and lower-case for header field name |
| 4 | support both upper-case and lower-case for domain-name in both URL and "Host" field |
| 5 | support header field value preceded/appended by any amount of LWS |
| 6 | support header fields extended over multiple lines (majorly for "Cookie" header field) |
| 7 | support different orders of HTTP header fields |
| 8 | support any-length cookie value in "Cookie" header field |
| 9 | support any-length path name in URL and hostname |

| 10A |
|---|
| 10B |
| 10C |

FIGURE 10A

| Items | Supported syntax |
|---|---|
| 10 | support all Methods (case-sensitive) |
| 11 | support URL format like "GET http://www.yahoo.com/pub/index.html" (identify domain-name is preceded by "/" not "/") |
| 12 | support URL format like "GET /www.yahoo.com/pub/index.html" (identify domain-name is in URL) |
| 13 | support URL format like "GET /pub/index.html" (identify domain-name is not in URL) |
| 14 | support URL format like "GET /index.html" (identify "." char is a suffix mark not domain-name mark) |
| 15 | support URL format like "GET /pub/index" (identify no suffix) |
| 16 | support URL format like "GET /pub/" (identify no suffix and the end mark of the URL) |
| 17 | support URL format like "GET /pub" (identify no suffix and the end mark of the URL) |
| 18 | support URL format like "GET /" (identify no URL) |
| 19 | support URL format like "GET  /pub  " (identify extra whitespace before and after URL) |
| 20 | support URL format like "OPTIONS * http/1.1" (identify "*" mark, not URL. Domain-name???) |
| 21 | support Domain-name appears in both URL and "Host" field |
| 22 | Support Domain-name appears in "Host" field not in URL |
| 23 | Support Domain-name appears in URL, not "Host" field |
| 24 | Support Domain-name appears neither URL nor "Host" field |
| 25 | Support URL starts and ends in the same 64-bit chunk data like<br>*<br>/<br>/a<br>/a/b<br>/a/b/<br>/a.b<br>/a.b/<br>/a.b/c<br>/a.b/c/<br>/a.b.c/d<br>/a.b.c.d/<br>/a/b/c.d<br>/a/b.c.d<br>/a.b.c.d |

FIGURE 10B

| Items | Supported syntax |
|---|---|
| 26 | Support Cookie value starts and ends in the same 64-bit chunk data like<br>a=b;<br>a=b.c<br>a=b; c=d;<br>a=b,<br>a=b<CR><br>a=b.c.d;<br>a=b; c=d<CR><br>a=b;  c=d; |
| 27 | Detect "Get: URL", "Geta URL" with Methods matched in whole word but over the word length |
| 28 | Detect "Host Hostname" "Hosta Hostname". It will not be regarded as a Host header field since no colon following "Host" |
| 29 | Support separator " ", ":", "/", "," in URL. Whitespace is the end character of URL |
| 30 | Consume multiple-slash, multiple-dot, multiple-colon in URL |
| 31 | Support http://www.yahoo.com:8001/a/b |
| 32 | Support separator " " in "Host" value. Whitespace and <CR> are the end charaters of Host value |
| 33 | Support separator "," in Cookie Name if the cookie value is IP/MAC address. The end characters for this scenario is ";", " ", "," or <CR> |
| 34 | Support the terminator character ";", " ", "," or <CR> for generic cookie value |
| 35 | support different patterns for "Methods", "Header Name", HTTP end string when provide those patterns in two 64-bit chunk data |

FIGURE 10C

```
GET /myhome/mysports/myinjuries HTTP/1.1
Accept: */*
Accept-Language: gzip,deflate
User-Agent: Mozilla/4.0 (compatible; MSIE 5.0; Windows 98; DigExt)
Host: www.myhomepage.com
Connection: Keep-Alive
Cookie: registered=no; UID 23456890 mesp_popup=y2k% 3Dyes; TID=2651798134582
KID = 20103234; chartype =HIST; chartview = 1WEEK.
```

FIGURE 11

| Name | Bit fields | Length (bytes) | Description |
|---|---|---|---|
| Key | 255:0 | 32 | Key which is used to proceed the exact-match comparison. If match, the association data will be returned to AE. Otherwise, AE CAM will return a miss status to AE |
| Association | 63:52 | | reference_count used for SW |
| | 51:48 | | Instructions for AE.<br>0000:Miss Stop. Finish searching. Key is not found<br>0001:Exact Hit Stop. Finish searching since an exact match is achieved. The association data is the result<br>0001:Wildcard Hit Stop. Finish searching since a wildcard match is achieved. The association data is the result<br>0010:Left Continue. Continue to search using the reverse key<br>0011:Domain-Left_Continue. BSI+Domain matches. Continue to search using reverse key if key is not over. If the followed searches are a miss, we will use CSI retrieved in this association data<br>0100:Exact_Hit_Left_Continue: Continue to search using reverse key if key is not over. Otherwise use CSI in this association data<br>0101:Wild_Hit_Left_Continue:Continue to search using reverse key if key is not over. Otherwise use CSI in this association data no matter what's the result of subsequently searches<br>0110-111:reserved |
| | 47:32 | | Next subkey length in bytes<br>eg 0x6 if the next-subkey length is 4 bytes and 6 bytes |
| | 31:22 | | The table number used by the next subkey. The first-layer table number is 1-8 |
| | 21:0 | | 22-bit CA subservice index (CSI) |
| | | 8 (Total) | |

FIGURE 12

| Name | Bit fields | Length (bytes) | Description |
|---|---|---|---|
| Key | 15:0 | 2 | The BLT subservice index (BSI) or virtual service index (VSI) |
| Association | 239:216 | 3 | CA subservice index (CSI) used for default BSI domain service purpose. In our system, we only use 22-bit as csi. The other bits are reserved |
|  | 215:200 | 2 | instructions on how to use the cookie value associated with this cookie name. In our system, we only use 2 bits as cookie_name_mode. The other bits are reserved |
|  | 199:0 | 25 | The cookie name specified by the virtual service index |
|  |  | 30 (Total) |  |

FIGURE 13

| | inputs | | | | valid bits | | | | id field filled | id field value | pri |
|---|---|---|---|---|---|---|---|---|---|---|---|
| SSL connection | cookie mode enabled | cookie found | SIPSID entry found | sid | cid | cookie_hash | server_id | | | | |
| yes | NA | NA | NA | 1 | 0 | 0 | 0 | cookie_id/ session_id | session_id = hash(SSL session ID) | 1 |
| no | any | no | NA | 0 | 1 | 0 | 0 | cookie_id/ session_id | default_cookie_id | 2 |
| | cookie_learn | yes | NA | 0 | 1 | 0 | 0 | cookie_id cid_valid = 1 | cookie_id = hash(cookie_value) | |
| | directive_hash | yes | NA | 0 | 0 | 1 | 0 | cookie_hash | cookie_hashing_ID = hash(cookie_value) | |
| | self_id | yes | no | 0 | 1 | 0 | 0 | cookie_id/ session_id | cookie_id = default_cookie_id | |
| | | yes | yes | 0 | 0 | 0 | 1 | server_id | server_id = SIPSID[key] where key = BSI + cookie_value | |
| | none | NA | NA | 0 | 0 | 0 | 0 | none | none (result of header parsing will be used) | 3 |

FIGURE 15

METHOD OF AND SYSTEM FOR ANALYZING THE CONTENT OF RESOURCE REQUESTS

This application claims the benefit of U.S. Provisional Application No. 60/355,922, entitled "Network Switch", filed Feb. 11, 2002, and is a continuation-in-part of U.S. patent application Ser. No. 10/098,957, entitled "Switching System", filed Feb. 11, 2002. Both of these applications are fully incorporated by reference herein as though set forth in full.

RELATED APPLICATIONS

This application is related to U.S. patent application Ser. No. 60/335,922, entitled "Network Switch", filed Feb. 11, 2002; U.S. patent application Ser. No. 10/073,483, entitled "Method Of And System For Allocating Resources To Resource Requests Based On Application Of Persistence Policies," filed May 6, 2002; U.S. Pat. No. 7,584,262, entitled "Method Of And System For Allocating Resources To Resource Requests Based On Application Of Persistence Policies," filed Feb. 12, 2002; U.S. Pat. No. 7,321,926, entitled "Method Of And System For Allocating Resources To Resource Requests," filed Feb. 11, 2002; U.S. Pat. No. 7,152,124, entitled "Method And System For Maintaining Temporal Consistency Of Resources And Data In A Multiple-Processor Packet Switch," filed Feb. 11, 2002; U.S. Pat. No. 6,781,990, entitled "Method And System For Managing Traffic In A Packet Network Environment," filed Feb. 11, 2002; U.S. patent application Ser. No. 10/073,484, entitled "Method And System For Translating Packet Sizes In A Network," filed Feb. 11, 2002; and U.S. Pat. No. 7,447,777, entitled "Switching System," filed Feb. 11, 2002. Each of the foregoing applications is owned in common by the assignee hereof, and each is hereby fully incorporated herein by reference as though set forth in full.

FIELD OF THE INVENTION

This invention generally relates to content analysis of resource requests, server load balancing, persistence and load balancing policies, and data networks, and, more specifically, to a content analysis engine for analyzing the content of resource requests which is modularized, scaleable, and suitable for high throughput applications.

RELATED ART

Referring to FIG. 1, a data network 100 is illustrated in which individual servers 102a, 102b, 102c within server bank 102 are assigned the same IP address, and network entity 104 is responsible for allocating resource requests from client 106 to specific servers within server bank 102.

To avoid replication of server resources across each of the individual servers, server resources may be assigned to specific servers or classes of servers according to a known classification system. Entity 104 is responsible for determining the class of service desired for a resource request, and routing the request to a specific server responsive thereto utilizing the known classification system. In the case in which resource requests are spawned by or represented by packets, entity 104 may be required to analyze the content of a packet to determine the class of service desired for the packet.

Conventional implementations of network entities configured for routing resource requests to specific servers based on content are subject to significant bottlenecks, particularly as the number of connections being simultaneously handled approaches one million connections. One of these bottlenecks is the time required to perform the content analysis required to route a resource request to its desired destination.

These bottlenecks pose significant latency and problems issues for applications involving high throughout and/or large numbers of connections.

SUMMARY

In one aspect, the invention provides a method of determining a desired category of service for a resource request based on an analysis of the content thereof. A database associates categories of service with value of a key. When a resource request is received, a key is derived from an analysis of the content of the request. The database is then accessed using the key to determine one or more matching entries. The desired category of service is then derived from the one or more matching entries.

In a second aspect, the invention provides a method of determining cookie information from a resource request. A database associates resource requests with cookie names. When a resource request is received, the database is accessed to determine a cookie name associated with the resource request. A cookie having the cookie name is then located in the resource request. The cookie information is then derived from the cookie value.

In a third aspect, the invention provides a method of determining cookie information from a resource request. A database associates resource requests with cookie processing modes. When a resource request is received, the database is accessed to determine a cookie processing mode associated with the resource request. A cookie is located in the resource request, and the value of the cookie then processed in accordance with the cookie processing mode to obtain the cookie information.

In a fourth aspect, the invention provides a method of determining session information from a resource request. A session identifier is located in a handshake message associated with the resource request. The session information is derived from the session identifier.

In a fifth aspect, the invention provides a method of determining a desired category of service and one or more content identifiers from a resource request. The desired category of service is derived from an analysis of the content of the resource request. In parallel with this step, one or more content identifiers are derived from the resource request.

In a sixth aspect, the invention provides a method of allocating a resource to a resource request. A desired category of service is derived from an analysis of the content of the resource request. In addition, one or more content identifiers are derived from an analysis of the content of the resource request. A resource is then allocated to the resource request responsive to one or both of the desired category of service for the resource request and the one or more content identifiers.

System counterparts to each of these methods are also provided. Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 5 is a simplified flowchart illustrating an overall method of operation of the system of FIG. 2.

FIGS. 6A-6B are simplified block diagrams of embodiments of a system according to the invention in which an association engine derives a search key from the content of a resource request and determines a desired class or sub-class of service for the request responsive thereto.

FIG. 6C illustrates an example format of a database entry in the systems of FIGS. 6A-6B.

FIGS. 10A-10C illustrates an example of supported http header syntax.

FIG. 11 illustrates an example of an http header.

FIG. 12 illustrates an example format of an association engine CAM entry.

FIG. 13 illustrates an example format of a cookie name table entry.

FIG. 15 is a table illustrating possible settings of the fields of the communication of FIG. 14.

DETAILED DESCRIPTION

Example Application

Figure 1:
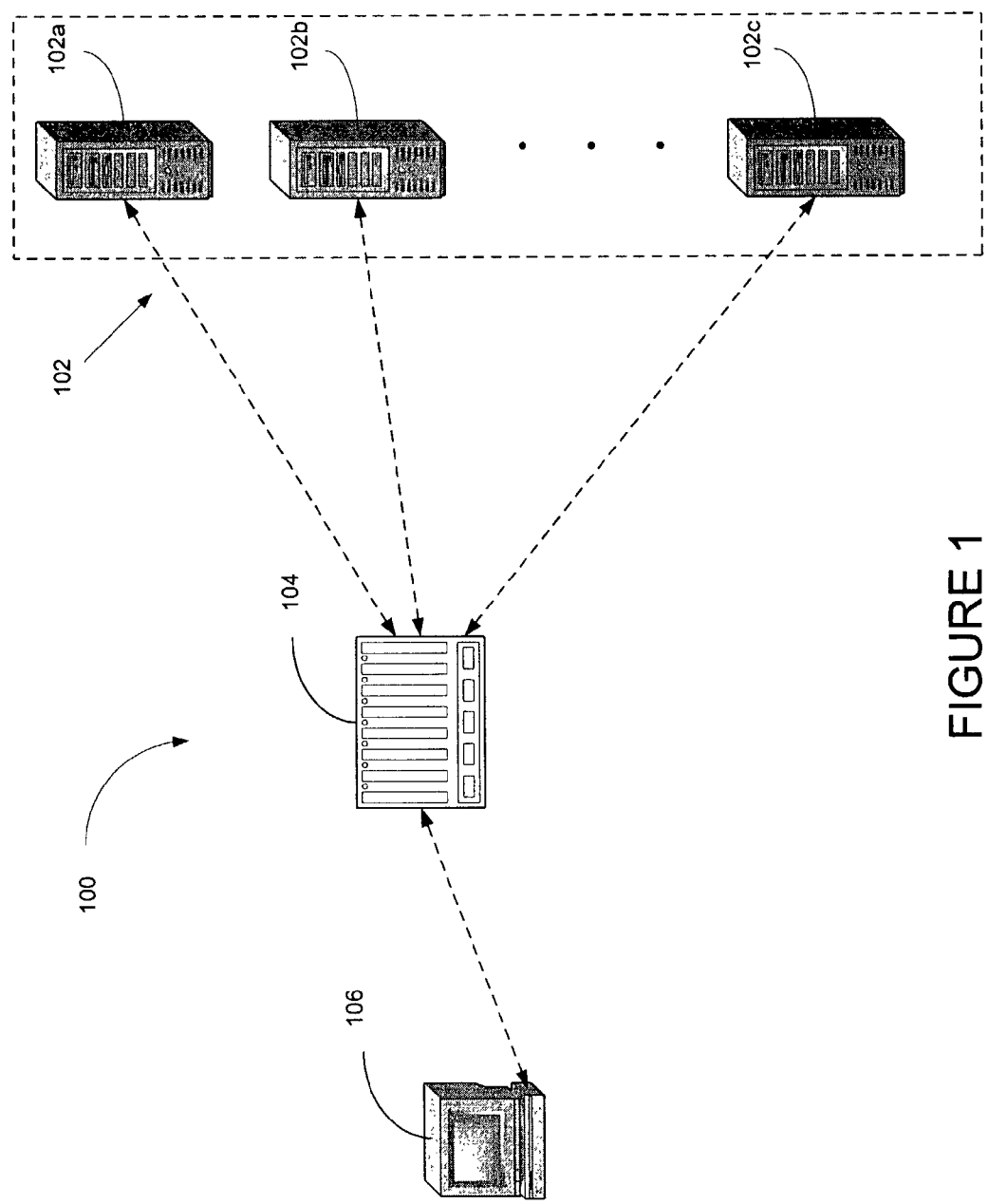
FIG. 1 illustrates a data network in which resource requests are routed to individual servers within a server bank by a network entity.
Figure 2:
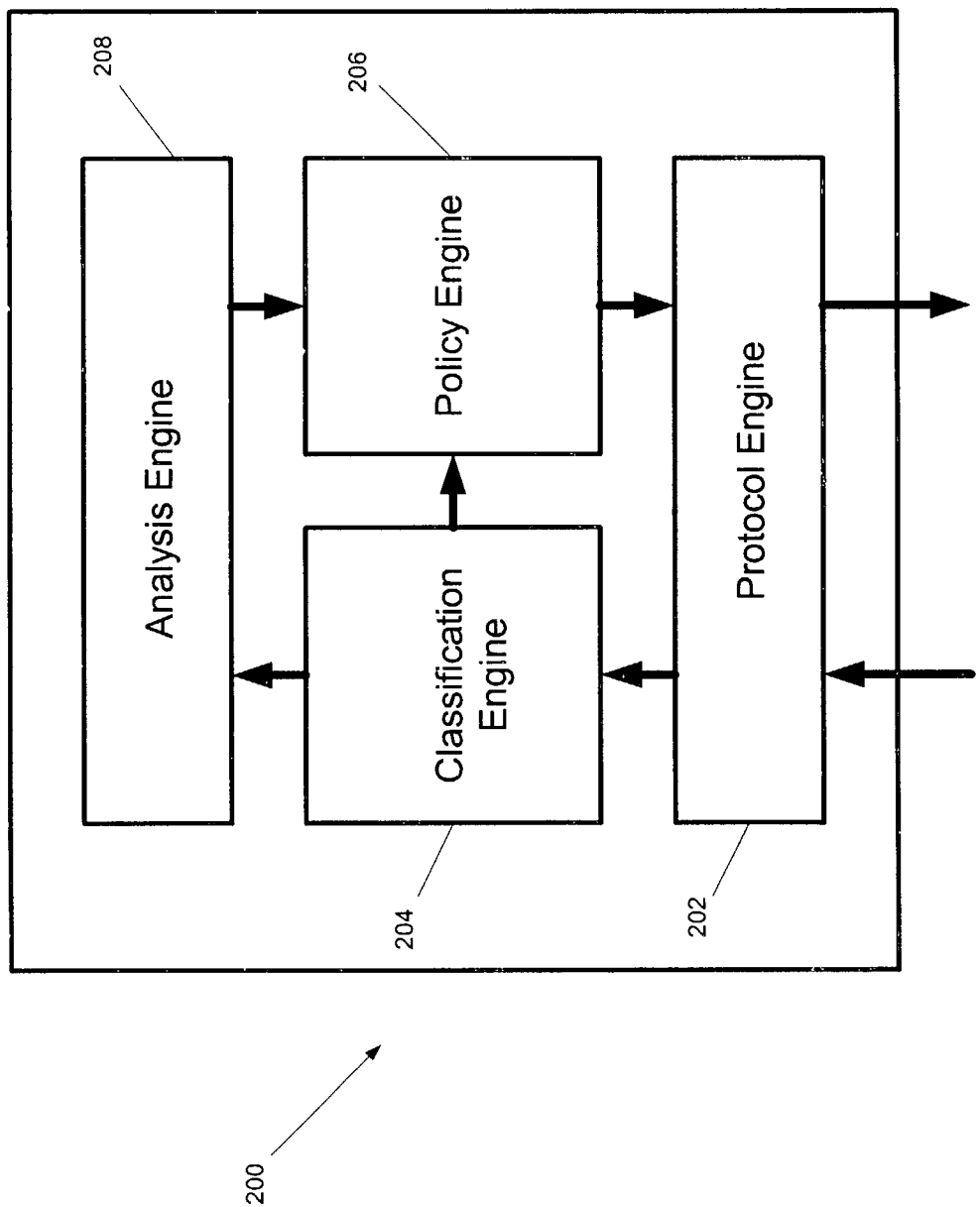
FIG. 2 is a simplified block diagram of a system representing an example application of the invention.

FIG. 2 illustrates an embodiment of a system 200 for handling resource requests which represents an example application of the invention. This example is being provided solely to add context and aid in the understanding of the invention. Other applications are possible, so this example should not be taken as limiting.

The system of FIG. 2 comprises a protocol engine 202, a classification engine 204, an analysis engine 208, and a policy engine 206. The protocol engine 202 receives a resource request in accordance with a prescribed protocol, and classification engine 204 determines the class of service called for by the request. Analysis engine 208 may analyze the request to determine the sub-class of service called for by the request. Responsive to one or both of these determinations, policy engine 206 may identify and allocate a resource to the request. The engines 202, 204, 206, and 208 may each be implemented as hardware, or a combination of hardware and software.

Figure 3:
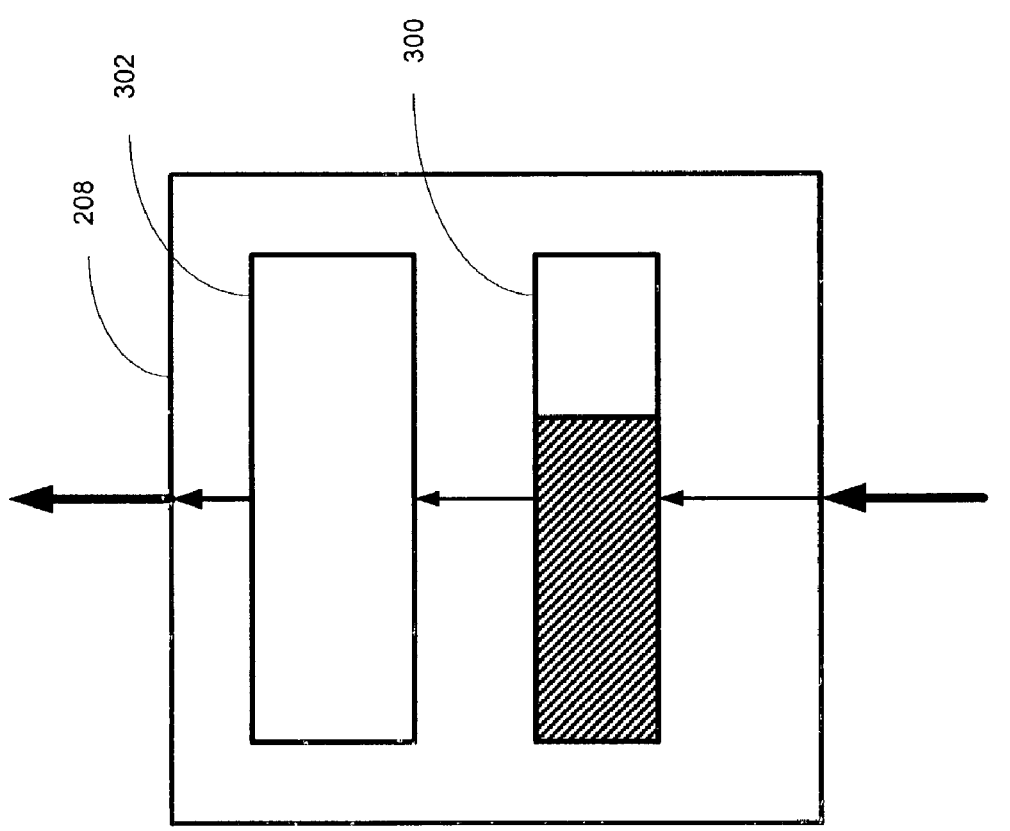
FIG. 3 is a simplified block diagram showing a re-assembly buffer and a content analyzer within the analysis engine of the system of FIG. 2.

In one implementation, the resource requests are embodied as or spawned by packets which, in one example, are TCP/IP packets. Moreover, referring to FIG. 3, the analysis engine 208 comprises an assembly engine 300 (which in one example may be referred to as the external memory unit (EMU)), and a content analyzer (CA) 302. In this implementation, each of the engines may be implemented in hardware, for example, as one or more finite state machines.

In this implementation, an interface engine (not shown) receives a packet, buffers it, and checks it for checksum errors. While the interface engine is checking the packet for checksum errors, classification engine 204 accesses the packet and derives two keys therefrom. The first key is derived from a 5-tuple consisting of the following pieces of information obtained from the packet header: source IP address, destination IP address, source port, destination port, and protocol. The second key is derived from a 3-tuple consisting of the following pieces of information obtained from the packet header: destination IP address, destination port, and protocol.

If the interface engine detects a checksum error in the packet, it flushes the packet from the system 200 before a server has been allocated to the packet or before the packet is sent to its desired destination.

Assuming a checksum error is not detected, classification engine 204 utilizes the first key to access a first content addressable memory (CAM) (not shown) and determine therefrom whether a client-server connection exists for the packet. The entry in the CAM corresponding to the first key is analyzed to determine if it corresponds to a client-server connection, or is the null value, indicating that a client-server connection does not exist.

A connection may be defined with the aid of layered reference models for depicting the movement of information between entities connected to a network. The layers in the reference models help to segregate information and network functions into manageable units. The general functions of each layer are often based on an international standard called Open System Interconnection (OSI) Reference Model promulgated by the International Standard Organization (ISO).

OSI sets forth seven processing layers through which information may pass when transmitted between network entities. Layer 1 is the physical layer, layer 2 is the data link layer, layer 3 is the network layer, layer 4 is the transport layer, layer 5 is the session layer, layer 6 is the presentation layer, and layer 7 is the application layer.

Another layered reference model that is widely implemented is the TCP/IP (Transmission Control Protocol/Internet Protocol) Reference Model. TCP/IP defines four processing layers through which information may pass when transmitted between network entities. Layer 1 is the host-to-network layer, and corresponds to the combination of layers 1 and 2 in the OSI model. Layer 2 is the Internet Protocol (IP) layer, and corresponds to layer 3 in the OSI model. Layer 3 is the transport layer, and corresponds to layer 4 in the OSI model. Either of two end-to-end protocols may apply to layer 3 in the TCP/IP model. The first is a connection oriented protocol known as the Transmission Control Protocol (TCP). The second is a connectionless protocol known as the User Datagram Protocol (UDP). Layer 4 is the application layer, and corresponds to layer 7 in the OSI model. Counterparts to layers 5 and 6 in the OSI model are not present in the TCP/IP model.

If a flow (layer 4) connection has been established for the packet, protocol engine 202 arranges to have the packet sent to its desired destination, whether client or server. Similarly, if a layer 5 client-server connection has been established for the packet, and the packet originates from a server, protocol engine 202 sends the packet to the client called for by the connection.

Classification engine 204 also utilizes the second key to access a second CAM (not shown), and determine therefrom the desired class of service for the packet, whether layer 4 or layer 5. Each entry in the second CAM associates a desired class of service with the possible values of the second key. The desired class of service output by the second CAM is utilized only when the access to the first CAM indicates a connection does not yet exist for the packet.

If the desired class of service is layer 4, and a connection does not yet exist, classification engine 204 issues a service request to policy engine 206. In response, policy engine 206 allocates a server to the request based on application of a suitable load balancing policy, e.g., round robin, least connections, etc., and/or persistence policy. Protocol engine 202 then creates a connection with the server, makes suitable entries in the first CAM and corresponding control block, and forwards the packet to the interface engine for transmitting to the server.

If the desired level of service is layer 5, and a connection does not exist, and the packet has originated with a client, protocol engine 202 causes an assembly buffer to be allocated in EMU 300, for assembling the packet into a larger data grouping. Once the buffer has been allocated, EMU 300 inserts the packet at the appropriate location in the assembly buffer. Additional packets from the client are also added to the buffer until an http end-of-header is detected (or the buffer is full, or the end of the payload in a POST method is detected, or, in applications involving SSL, the end of an SSL record is detected). As the packets are received, protocol engine 202 acts as a server proxy inasmuch as it acknowledges receipt of the packets to the client, and uses TCP sequence space to indicate left-wise contiguity in the EMU buffer. Thus, if the packets are received in order, protocol engine 202 increments the next available sequence number in sequence space with the length of the packets as the packets are received. However, if the packets are received out of order, protocol engine 202 updates the next available sequence number in sequence space to accommodate the length of the packet on a deferred basis, i.e., when left-wise contiguity is present.

Once an appropriate data grouping has been assembled in the EMU 300, the data grouping is passed to CA 302, which analyzes the content thereof, and, responsive thereto, determines a desired sub-class of service. For example, in the case of http, once an http end-of-header has been detected, the header contents are passed to CA 302 for analysis thereof. In the case of https, once a https record layer has been obtained, the record layer contents (and the corresponding encrypted http string) are passed to CA 302 for analysis thereof. The CA 302 may also derive certain cookie or session information from the contents of the data grouping and pass this on to policy engine 206. Such information may include a cookie or session identifier, a hash value derived from cookie information, or a server identifier derived from cookie information. Policy engine 206 may use this information for allocating a server based on application of a persistence policy.

Responsive to the desired class of service as determined by classification engine 204, the desired sub-class of service as determined by analysis engine 208, and any cookie or session information which is derived by analysis engine 208, policy engine 206 allocates a server based on application of a suitable load balancing or persistence policy. If a persistence policy is applicable, a server is identified which is allocated to the request based on application of such a policy. If a persistence policy is inapplicable, a server is identified and allocated to the request based on application of a suitable load balancing policy.

Examples of the load balancing policies which may be applicable include round robin, weighted round robin, least connections, weighted least connections, or utilization percentage. Examples of the persistence policies which may be applicable include self-identification stickiness, cookie hashing stickiness, client-based persistence, cookie identifier based persistence, or session identifier based persistence.

According to self-identification stickiness, a server identifier is derived by analysis engine 208 from cookie information, and the server identified by this information is allocated to the request. According to cookie hashing stickiness, a service index and/or hash value derived by analysis engine 208 from cookie information is used to identify and allocate a server to the request. According to client based persistence, a service index and/or client IP address is used to connect the client which issued the request to the server previously connected to the client. According to cookie identifier based persistence, a cookie identifier derived by analysis engine 208 is used to connect the client which issued the request to the server which issued the cookie. According to session identifier based persistence, a session identifier derived by analysis engine 208 is used to connect the client which issued the request to the server which issued the session identifier.

The protocol engine 202 then binds the server which has been allocated to the client-side portion of the connection, and makes suitable entries in the first CAM and corresponding control blocks. It then passes the contents of the assembly buffer to the interface engine for subsequent transmission to the server, and purges the buffer upon confirmation of receipt.

Each entry in the first CAM may be implemented as a pointer to a corresponding control block maintained by protocol engine 202, where the pointer bears a 1-1 relationship with the connection. In the case of a flow (layer 4) connection, the control block contains information relating to both the client-system connection, and the system-server connection. In the case of a layer 5 connection, the control block may contain information relating to the client-system connection or the system-server connection. If a server has been bound to a layer 5 client connection, the corresponding control block may be bound to the control block corresponding to the system-server connection.

When a connection is created, a generation count is assigned to the connection and data representative thereof stored in the control block for the connection. When a server is to be bound to a connection, protocol engine 202 first compares the generation count stored in the control block for the connection with the expected generation count, and binds the server to the connection only if the stored generation count is equal to the expected value.

When a packet is received, the packet header will specify a client or server as the source of the packet, and the system 200 as the destination of the packet. If a layer 4 connection has been established for the packet, the control block associated with the connection is retrieved. Responsive thereto, protocol engine 202 modifies the packet header to indicate the system 200 as the source of the packet, and the client or server called for by the control block as the destination of the packet. It then provides the packet to the interface engine for transmitting to the desired destination.

If a layer 5 client-server connection has been established for the packet, and the packet originates with a server, the control blocks associated with the connection are retrieved. Responsive thereto, the protocol engine 202 modifies the packet header to indicate the system 200 as the source of the packet, and to indicate the client specified by the control blocks as the destination of the packet. If then provides the packet to the interface engine for transmitting to the client.

For packets originating with a client, where the desired level of service is layer 5, the system 200 buffers the packet in an assembly buffer in the EMU 300, thus allowing a server to be allocated to the packets based on the content of an http or https segment encapsulating the packet.

Figure 4:
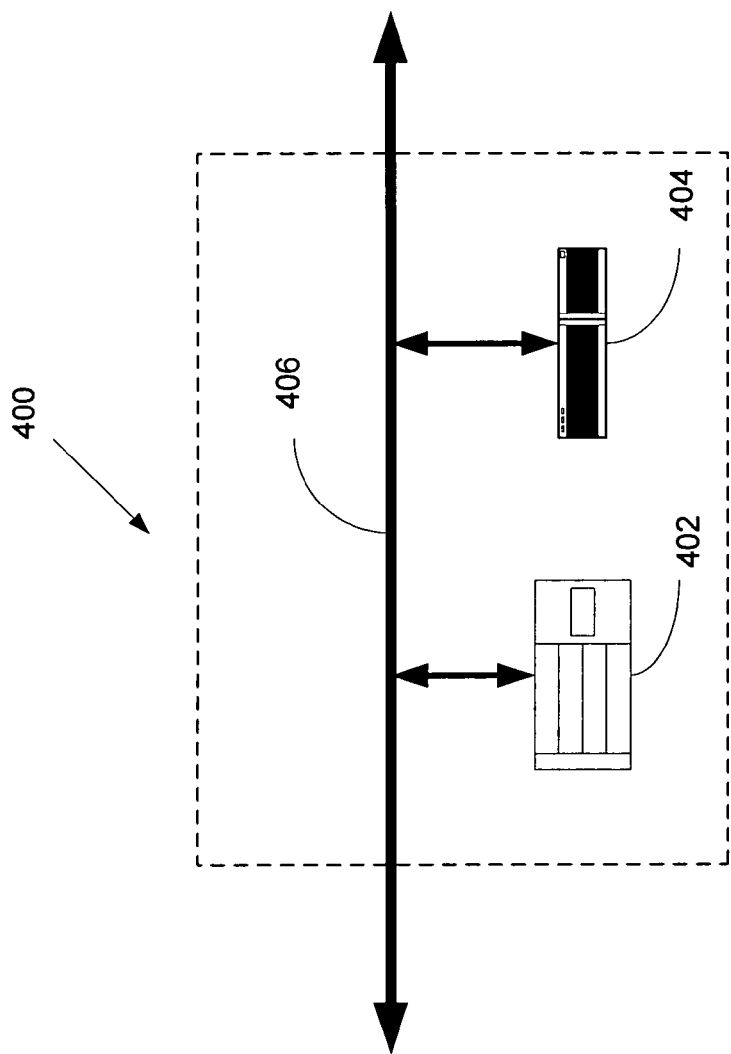
FIG. 4 is a simplified block diagram illustrating a particular end use configuration of the system of FIG. 2.

As illustrated in FIG. 4, an example application of the system of FIG. 2, network entity 400 comprises layer 3 switch 402, Ethernet bus 406, and layer 4/layer 5-7 switch 404 configured to embody a system according to the invention. The switch 402 is configured to route packets at the layer 3 level while switch 404 is configured to route packets at the layer 4 level, the layer 5 level, or at levels above layer 5 (layers 6-7 in the OSI model).

When a packet is received by network entity 400 over Ethernet bus 406, if layer 3 service is called for, switch 402 assumes responsibility for routing the packet to its desired destination. However, if layer 4, layer 5, or layer 5+ service is called for, switch 404 assumes responsibility for routing the packet to its desired destination.

Referring to FIG. 5, a simplified flowchart of one embodiment of an overall method of operation according to the invention is illustrated. The method begins with step 500, where a resource request is received in accordance with a specified protocol. The resource request may or may nor be in the form of a packet. Moreover, the specified protocol may or may not be the TCP/IP protocol.

The method proceeds to step 502, which comprises determining a desired class of service for the request. The classes of service which are possible may or may not include layer 4, layer 5, layer 6, layer 7, or any combination thereof, classes of service. In one example, the desired class of service is represented by a Base Service Index (BSI). Moreover, one class of service may be determining that a resource has already been allocated to the request, and taking appropriate action in response thereto. For example, if the request is in the form of a packet, if a connection to a server already exists for the packet, then this step may comprises simply routing the packet to the destination called for by the existing connection in accordance with the specified protocol.

After step 502, optional step 504 is performed. In optional step 504, the request is analyzed to determine a desired sub-class of service. In one example, this step comprises analyzing the content of a packet or data grouping associated with the request, and the desired sub-class of service is represented by a Content Analyzer Service Index (CSI). In one example, other information may be determined in this step, such as information relating to the implementation of persistence policies. Examples of such information include server ID derived from a cookie value in the packet or data grouping (used to implement self-identification stickiness), a hash of a cookie value in the packet or data grouping (used to implement cookie hash stickiness), a cookie ID comprising a hash of a cookie value in the packet or data grouping (used to implement cookie ID based persistence), a SSL session ID comprising a hash of a content or message type field obtain from a https record layer (used to implement SSL session ID based persistence), and a client IP address (used to implement client-based persistence).

The method then proceeds to step 506, which comprises allocating a resource to the resource request responsive to one or both of the desired class of service, and the desired sub-class of service. In one example, persistence-related information derived in step 504 is also used to allocate a resource to the resource request.

In one configuration, if a persistence policy is applicable, a resource is allocated to the request based on application of the persistence policy, while, if a persistence policy is inapplicable, a resource is allocated to the request based on application of a load balancing policy.

Examples of the persistence policies which may be applicable include self-identification stickiness, cookie hash stickiness, cookie ID based persistence, SSL session ID based persistence, and client based persistence.

Examples of the load balancing policies which may be applicable include round robin, weighted round robin, least connections, weighted least connections, utilization percentage, and priority based.

Embodiments of the Invention

FIG. 6A illustrates a first embodiment of a system according to the invention for determining a desired class or sub-class of service for a resource request. The system comprises an association engine 602 and a database 604, with entries in the database associating values of a key with indicators of a desired class or sub-class of service. The association engine 602 receives a resource request as an input, as represented by identifying numeral 606, and derives a key from the content of the resource request. Engine 602 uses the key to access one or more corresponding entries in the database 604. The desired class or sub-class of service for the resource request is derived from the one or more corresponding entries in the database 604. The engine may derive and output an indicator of the desired class or sub-class of service for the resource request, as represented by identifying numeral 608.

In the case in which the system of the invention is deployed within a data network, the resource requests which are input to the system may be in the form of or spawned by packets which are transmitted over the network. If the packets originate from clients within the network, they may represent requests from the clients to be connected to servers for the establishment of a connection. In the case in which the data network may be described in terms of a layered reference model, the packets may be encapsulated into data groupings consistent with specified layers of the reference model when they are input to the system of the invention.

In one example, the packets have been previously identified as requiring a desired class of service which represents layers 5, 6 or 7 in the OSI reference model, and the packets have been grouped into corresponding data groupings at the time they are input to the association engine 602. The association engine 602 is then responsible for analyzing the content of the data grouping, and determining the desired sub-class of service associated with the data grouping. This information, either alone or in combination with the previously-determined class of service, may be utilized to allocate a resource to the network entity which issued the packets. If the packets originated with a client, for example, this information may be utilized to allocate a server to the client which issued the packets, and thereby establish a connection.

Consider, for example, packets which are received over a network and have been identified as requiring a class of service which, in terms of the OSI reference model, comprises layer 5, 6, or 7 services. If the http protocol is in effect, the packets are grouped into data groupings known as http headers which are input to the association engine 602 along with an indicator of the desired class of service for the packets which may be referred to as the Base Service Index (BSI). The association engine 602 may analyze the content of the http header to identify the values of certain tags in the header which have been previously determined as important for assembling a key. For example, the engine 602 may determine the domain name and URL path associated with the header, and use this information, along with the BSI, to form a key. The engine 602 may utilize this information to access one or more corresponding entries in the database 604. The desired sub-class of service for the header may then be determined responsive to the one or more entries. An indicator of the desired sub-class of service, which may be referred to as the Content Analyzer Service Index (CSI), may then be output by the association engine 602.

In one implementation, an entry in the database 604 has the format illustrated in FIG. 6C. As illustrated, an entry consists of one or more fields (identified with numeral 610) which together form the value of the key associated with the entry, and a field (identified with numeral 612) which forms the value of the CSI associated with the entry. In this implementation, one or more entries are retrieved from the database 604 whose key matches that derived from the http header. If a match is obtained through a single entry, the CSI associated with that entry is taken to be the CSI for the header. If a match is obtained through more than one entries, one of the entries is selected using a suitable policy, and the CSI associated with the selected entry is taken to be the CSI for the header.

Consider, for example, the following http header:
GET /www.yahoo.com/san jose/sports.htm/ http/1.0
host: www.yahoo.com
content_type: text
cookie: Howrey=sandiego.com; B=extreme When this header is received by the association engine 602, it has already been determined that layer 5 service is desired for the header, and a BSI indicating this is received along with the header. The association engine 602 analyzes the content of the header to determine that the domain name associated with the header is www.yahoo.com. In this particular example, the association engine 602 may determine this from either the host name portion of the URL path (which immediately follows the http method, in this case, the word GET) or the second line of the header, which explicitly identifies the host name. The association engine 602 also determines the URL path associated with this header, in this case, san jose/sports.htm. A key is then formed from the combination of the BSI (indicating layer 5 service), the domain name (www.yahoo.com), and the URL path (san jose/sports.htm).

During configuration time, the database 604 was presumably initialized with an entry associating this key value with a CSI. This entry is retrieved from the database 604, and the corresponding value of the CSI taken to be the CSI for the http packet. In one application, the BSI and CSI (and possibly other information derived from the header) may then be used to identify a server for allocating to the client which issued the header. Once identified, the server may be bound to the client, and the http header then passed along to the server.

Referring to FIG. 6B, a second embodiment of the invention comprises a tokenizer 600 for parsing a data grouping into potential keywords, and providing them to association engine 602. Association engine 602 receives the potential keywords and derives a key therefrom. Association engine 602 then accesses the database 604 to find any entries having a key value which matches the key derived from the data grouping, and derives the desired class or sub-class of service from any such entries in the manner described in relation to the previous embodiment.

In the case in which the data groupings are http headers, in one implementation, the tokenizer 600 is configured to perform various background tasks, such as checking to see if the particular http method specified in the header is supported, and counting or ignoring URL delimiters such as '/', ':', and '.'

Consider, for example, the following http header: GET http://sports.yahoo.com/san jose/sports.htm. The tokenizer 600 in this implementation first extracts the header method GET and determines whether it is one of the supported method types, i.e., 'GET', 'PUT', 'POST', 'HEAD', 'OPTION', or 'TRACE'.... Assuming it is, the tokenizer 600 then examines the remaining portion of the header. It ignores certain items of text such as 'hap' or 'ftp' and counts the number of slashes '/' and periods '.' it encounters. If a double slash '//' or double period '..' is encountered, the corresponding counter is only incremented once. When the slash counter is equal to two, the contents of the period counter plus one is taken to be the number of tokens in the domain. In the previous example, when the slash following 'com' is encountered, the slash counter will be equal to two and the period counter will also be equal to two. At this point, the tokenizer 600 determines that the number of tokens in the domain name is three, i.e., the contents of the period counter plus one. It then parses the text delimited by the slashes, i.e., 'sports.yahoo-.com', into the three constituent tokens 'sports', 'yahoo' and 'com' and provides them to the association engine 602. The tokenizer 600 applies a similar process to identify the tokens in the remaining portion of the URL pathname, /san jose/sports.htm/. It parses this text into its constituent tokens, 'san jose', 'sports' and 'htm', and provides these tokens to the association engine 602.

If the domain name is not identified as part of the URL path name, the tokenizer 600 in this implementation then examines the remaining portion of the http header to determine if a host attribute is present. If so, it derives the domain from the value associated with the host attributes, parses this text into its constituent tokens, and provides these tokens to the association engine 602. Consider, for example, the following http header:
GET /pub/index.html
host: www.yahoo.com The tokenizer 600 first determines that the domain name is not specified as part of the URL path name (since the text at the root portion of the URL path name, 'pub', which is normally occupied by the host name does not end with a supported top level domain type, i.e., '.com', '.gov', '.edu', '.org', '.net', '.int', or '.mil'.). It then determines that the attribute 'host' is present in the header, and takes the attribute value 'www.yahoo.com' as the domain name.

In one implementation, if the tokenizer 600 is unable to detect a domain name in the header, it or the association engine 602 assigns a default domain name to the header. Similarly, in this implementation, if the tokenizer 600 is unable to detect a URL path in the header, it or the association engine 602 assigns a default URL path to the header. Consider, for example, the following http header:

GET /

Content_type=video

Since there is neither a host nor URL specified in this header, the tokenizer 600 or association engine 602 may assign both a default host and default URL path to the header.

The tokenizer 600 may also assign each of the tokens it has parsed with a code uniquely identifying that token before providing the tokens to the association engine 602. In one example, the codes are of uniform size, and assigned during configuration time to possible keyword values. A database embodying this association may be defined during configuration time, and then made accessible to the tokenizer 600, for use by it during the parsing process.

For example, during configuration time, the following association between tokens and 2-byte codes may be embodied in the database:

| | |
|---|---|
| www | 1 |
| yahoo | 2 |
| com | 3 |
| san jose | 4 |
| sports | 5 |
| htm | 6 |

As it performs the process of parsing a header into tokens, the tokenizer 600 may access this database and replace each of the tokens with its corresponding code before passing the same to the association engine 602.

Moreover, a FIFO buffer may be accessible by both tokenizer 600 and association engine 602, and provide the mechanism for communicating tokens from the tokenizer 600 to the association engine 602. In this example, tokenizer 600 places the tokens it has parsed onto the FIFO buffer, and association engine 602 accesses the FIFO buffer to retrieve the parsed tokens.

In a third embodiment of the invention, an entry in the database 604 may specify an exact or wildcard match for all or a portion of the key value. If more then one entry in the database matches the key corresponding to a request, a prescribed policy is applied to select one of the entries, and the desired class or sub-class of service derived from the selected entry.

In one implementation, each entry may specify an exact, a prefix (wildcard) match, a suffix (wildcard) match, or combinations of prefix and suffix (wildcard) matches for the URL pathname.

An exact match may be represented as A, a prefix match may be represented as A/*, a suffix match may be represented as */B, and a prefix and suffix match may be represented as A/*/B, where A and B specify text which is to be matched. Thus, consider the following examples of database 604 entries:

| | | | |
|---|---|---|---|
| $BSI_1$ | $domain_1$ | A/B | $CSI_1$ |
| $BSI_1$ | $domain_1$ | A/B/* | $CSI_2$ |
| $BSI_1$ | $domain_1$ | A/B/C/*/D | $CSI_3$ |
| $BSI_1$ | $domain_1$ | A/B/C/D/E | $CSI_4$ |

The first entry associates the Content Analyzer Service Index $CSI_1$ with the Base Service Index $BSI_1$, the domain name $domain_1$, and a URL pathname which is A/B exactly. The second entry associates the Content Analyzer Service Index $CSI_2$ with the Base Service Index $BSI_1$, the domain name $domain_1$, and a URL pathname which begins with A/B (any suffix is acceptable). The third entry associates the Content Analyzer Service Index $CSI_3$ with the Base Service Index $BSI_1$, the domain name $domain_1$, and a URL pathname which begins with A/B/C and ends with D. The fourth entry associates the Content Analyzer Service Index $CSI_4$ with the Base Service Index $BSI_1$, the domain name $domain_1$, and a URL pathname which is A/B/C/D/E exactly.

If more than one entry matches a particular key, in one example, the one which controls is the one with the longest URL prefix match. (Other examples are possible, so this example should not be taken as limiting.) Thus, in the above example, entries two and three will match a key formed from $BSI_1$, $domain_1$, and URL pathname of A/B/C/G/D. However, entry three will control, since it implies a longer prefix match than entry two. Therefore, the service request will be assigned a Content Analyzer Service Index of $CSI_3$.

Three special entry formats are BSI/domain/*, BSI/*/*, and BSI/*/URL. The first embodies a rule which assigns a CSI to a service request based on the combination of BSI and domain, without consideration of the URL pathname. This rule may be handled by an entry in the database 604 which specifies a wildcard match for the entirety of the URL pathname.

The second embodies a rule which assigns a CSI to a service request based solely on the BSI. This rule may be handled through an entry in the database 604 which specifies a wildcard match for the domain name and the entirety of the URL path name. Alternately, this rule may be handles through an entry in a separate database accessible by the association engine 602 which associates BSI values with a CSI value.

The third embodies a rule which assigns a CSI to a service request based on the combination of the BSI and URL pathname, but without consideration of the domain. This rule may be handled through an entry in the database 604 which specifies a wildcard match for the domain name.

In one implementation, the entries in database 604 may be established at configuration time to match a desired server configuration. A user may specify the desired configuration using a configuration table, and the system will then make suitable entries in the database 604 responsive to the specified configuration table.

Consider, for example, the following configuration table:

www.myhomepage.com

*.gif

/myhome*.jpg www.yourhomepage.com/yourhome/*

The first item indicates that all data or files within the domain www.myhomepage.com will be co-located on the same resource. The second item indicates that .gif images will be co-located on the same resource. The third item indicates that all .jpg files starting with the path /myhome will be co-located on the same resource. The fourth item indicates that all data or files within the domain www.yourhomepage.com and start with the path /yourhome will be co-located on the same resource.

During configuration time, in one implementation, the first item gives rise to an entry in database 604 of the following form: $BSI_1$, www.yourhomepage.com, *, $CSI_1$. The second item gives rise to an entry of the following form: $BSI_2$, *, *.gif, $CSI_2$. The third item gives rise to an entry of the following form: $BSI_3$, *, /myhome.jpg, $CSI_3$. The fourth item gives rise to an entry of the following form: $BSI_4$, www.yourhomepage.com, /yourhome/*, $CSI_4$. (The BSI which is assigned in this implementation to each of these entries is a content-independent indicator of the desired class of service associated with the resource.)

Figure 7A:
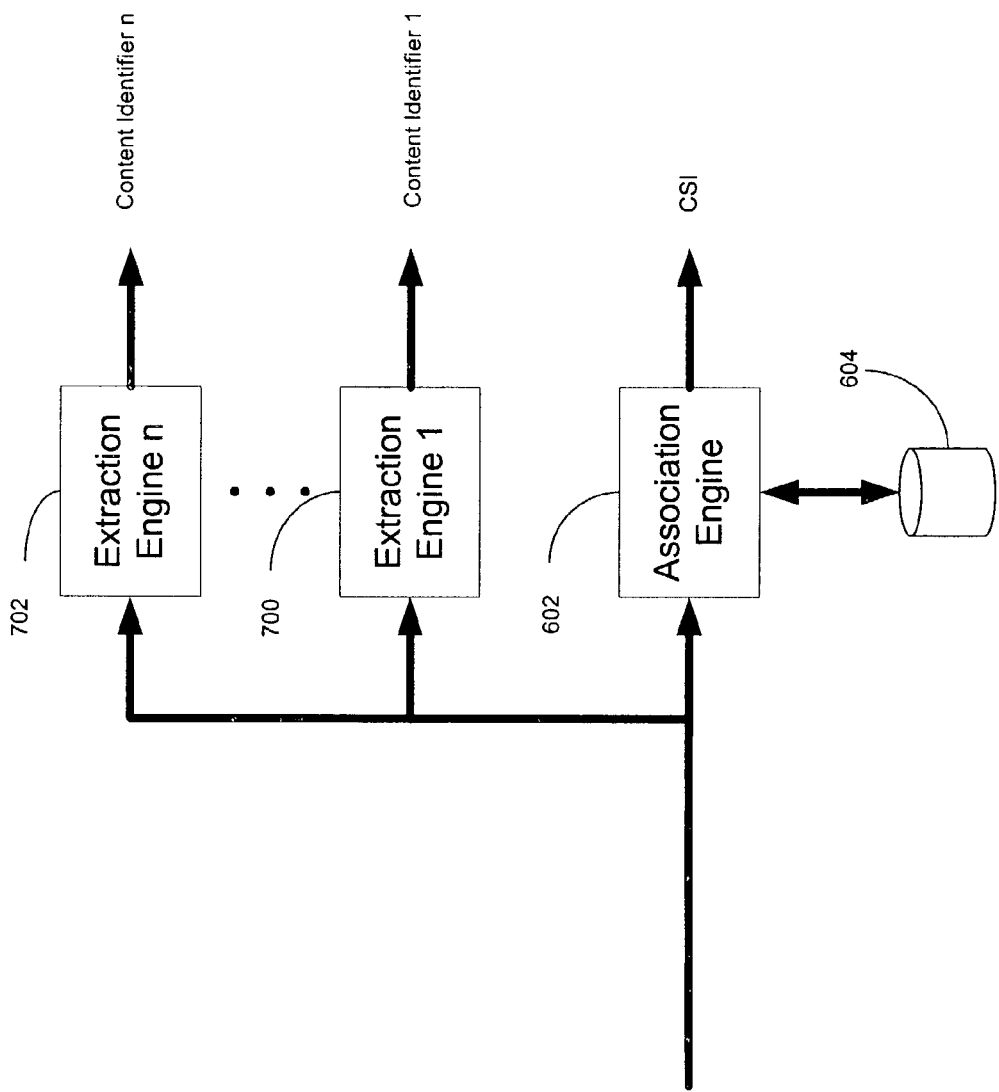
FIG. 7A is a simplified block diagram of an embodiment of a system according to the invention in which an association engine and one or more extraction engines function in parallel, the association engine to derive a search key from the content of a resource request and determine a desired class or sub-class of service for the request responsive thereto, and the extraction engines to each derive one or more content identifiers from the resource request.

Referring to FIG. 7A, in a fourth embodiment of the invention, a system for analyzing the content of a resource request comprises one or more extraction engines 700, 702 which each analyze the content of the resource request to extract a content identifier useful for allocating a resource to the resource request, and an association engine 602, which operates in conjunction with database 604 to determine a CSI or other indicator of the desired class or sub-class of service for the resource request.

The association engine 602 may be configured as described in any of the previous embodiments. The one or more extraction engines 700, 702 may each operate in parallel with association engine 602. Moreover, each of the extraction engines 700, 702 may be implemented as hardware, or a combination of hardware and software.

In one implementation, the one or more extraction engines 700, 702 comprise a cookie engine for extracting cookie information from a resource request embodied as or represented by a http header. The cookie information is useful for allocating a server or other resource to the client which issued the http header.

As is known, a cookie is an item of state-related information that a server may insert into an http object which is to be returned to the client. The client, in turn, may subsequently insert the cookie in http headers destined for the server.

In one implementation, a cookie is identified with the attribute 'cookie', and has a cookie name and a cookie value. The following is one example of a cookie:

cookie: A=xxxxxx;

In this example, the word 'cookie' is the attribute. The text 'A' is the cookie name, and the value 'xxxxxx' is the cookie value.

In this implementation, the cookie engine maintains a database which associates service classes or sub-classes with cookie names. When a resource request is received, the cookie engine also receives an indicator of the desired class or sub-class of service for the resource request, and uses the same to access a corresponding entry in the database. The entry specifies a cookie name, and the cookie engine then analyzes the http header corresponding to the resource request to determine if a cookie having the specified name is present.

If so, the cookie engine extracts the cookie value from the header, and derives information therefrom which may be used to identify and allocate a server to the client which issued the header.

In another implementation, the cookie engine also maintains a database which associates service classes or sub-classes with cookie processing modes. When a resource request is received, the cookie engine also receives an indicator of the desired class or sub-class of service for the resource request, and uses the same to access a corresponding entry in the database. The entry specifies a cookie processing mode. The cookie engine extracts a cookie value from the header, and then processes it in accordance with the specified cookie processing mode to obtain information which may be used to allocate a resource to the resource request.

For example, in one mode of operation, the cookie value itself may identify the server which issued the cookie. In this example, the server identified by the cookie value may be allocated to the client which issued the resource request.

In a second mode of operation, a database is maintained which associates cookie values with the identifiers of servers which issued the cookies. In this mode, the server which issued a particular cookie is identified using the database, and this server is then allocated to the client which issued the resource request from which the cookie is extracted.

In a third mode of operation, a database is maintained which associates cookie values with current and recently expired connections. In this mode, the database is accessed to determine whether a connection relating to a particular cookie exists or recently expired. If so, the server bound to this connection is identified and allocated to the client which issued the resource request from which the cookie is extracted to create a new connection. The database is then updated to reflect the new connection.

Figure 7B:
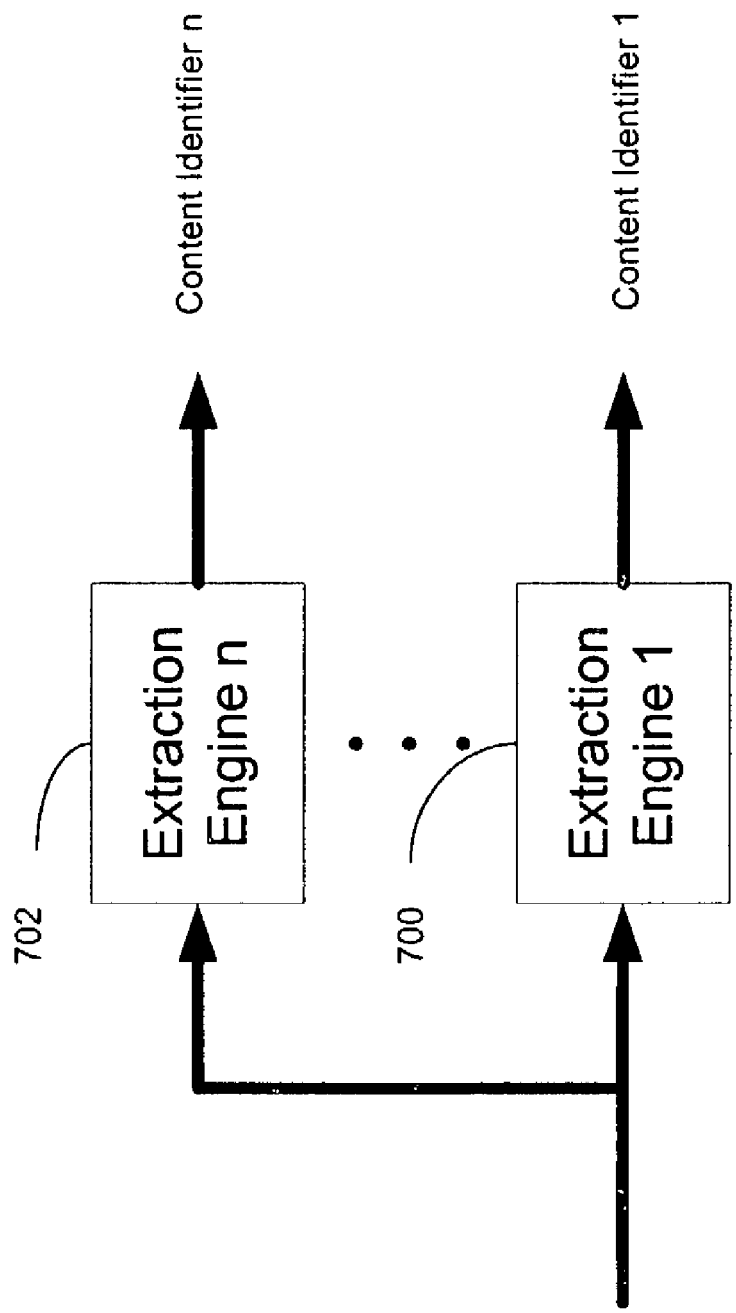
FIG. 7B is a simplified block diagram of an embodiment of a system according to the invention in which one or more extraction engines function to each derive one or more content identifiers from the resource request.

Referring to FIG. 7B, in a fifth embodiment of the invention, a system for analyzing the content of a resource request comprises one or more extraction engines 700, 702 which each analyze the content of the resource request to extract a content identifier useful for allocating a resource to the resource request.

In one implementation, the one or more extraction engines 700, 702 comprise a session engine which analyzes the content of a resource request embodied as or represented by a https header, and extracts therefrom a SSL session identifier. The session engine outputs SSL session information derived from the SSL session identifier. The SSL session information may be useful for the application of persistence policies.

As is known, an https header comprises a SSL record layer and an encrypted http string. Since the http string is encrypted, domain, URL, cookie, or other information cannot be obtained from the string. Instead, the session engine is required to derive the SSL session identifier from the content of the https record layer.

In one example, the session engine is configured to examine the SSL record layer of an incoming https header to determine if the message is a particular type known as a 'client hello' message. If so, the session engine extracts the session ID string from the SSL record layer, and outputs a session identifier derived from this information.

A database may be maintained which associates session identifiers with current and recently expired connections. This database is accessed to determine if connection relating to a particular session identifier exists or recently expired. If so, the server bound to this connection is identified and allocated to the resource request from which the session identifier is extracted to create a new connection. The database is then updated to reflect the new connection.

In the foregoing embodiments, the engines 602, 700, 702, 800, 802 may each be implemented in the form of hardware or a combination of hardware and software. In one implementation example, each engine 602, 700, 702, 800, 802 is implemented in the form of one or more finite state machines, as detailed in U.S. Provisional Application No. 60/335,922, previously incorporated by reference.

Implementation Example

Figure 8:
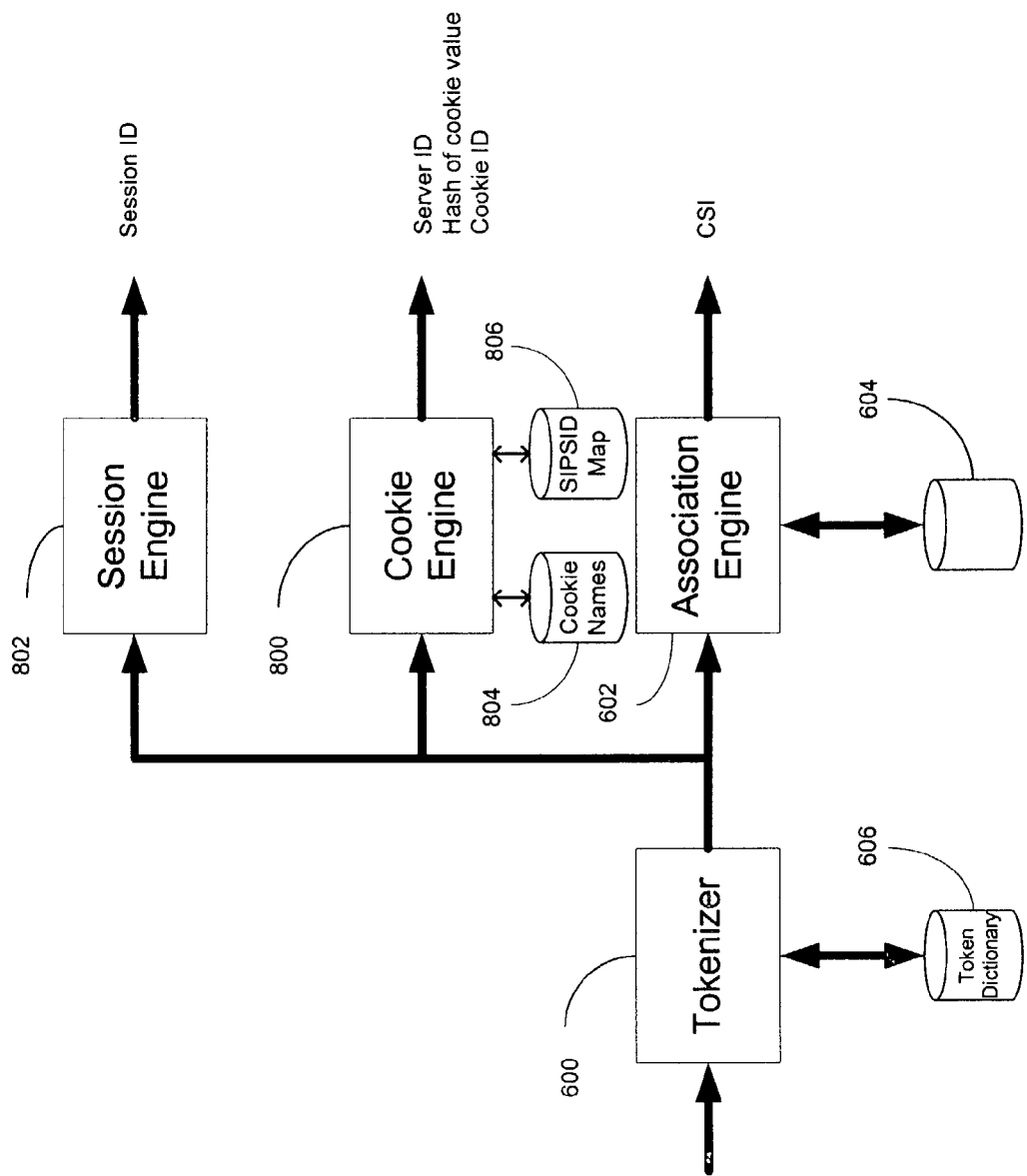
FIG. 8 is a simplified block diagram of an embodiment of a system according to the invention in which an association engine and one or the other of a cookie engine and a session engine function in parallel, the association engine to derive a search key from the content of a resource request and determine a desired class or sub-class of service for the request responsive thereto, the cookie engine to derive cookie information from a resource request in the form of a http header, and the session engine to derive session information from a resource request in the form of a https header.

Referring to FIG. 8, a block diagram of one implementation example of a system according to the invention is illustrated. In this implementation example, the system may serve as the content analyzer 302 within analysis engine 208 in the example application previously described and illustrated in FIGS. 2-3.

Figure 9:
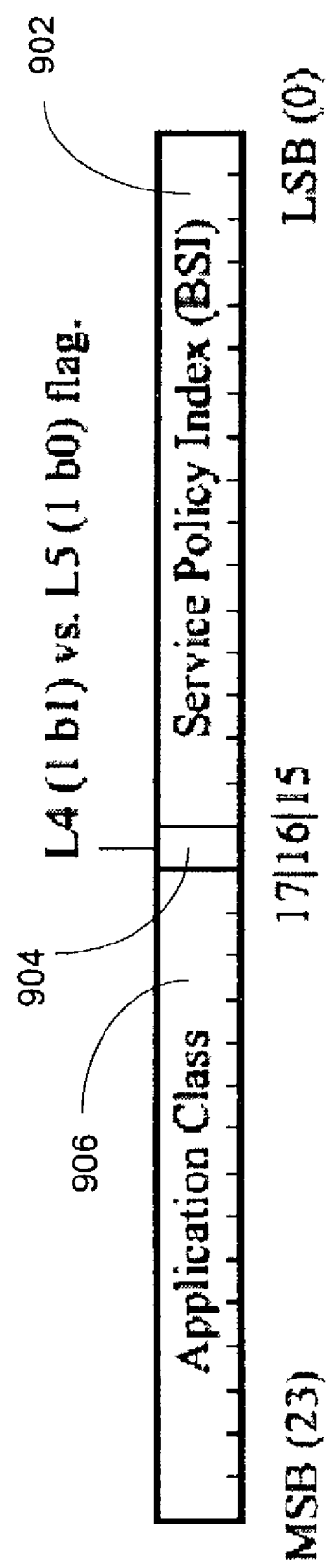
FIG. 9 illustrates an example format of a CAM entry output by the classification engine in the system of FIG. 2.

In this application, resource requests are embodied in the form of packets which are received by the system 200. Once received, the packets are classified by classification engine 204 depending on the desired category of service for the packets. In particular, classification engine 204 derives a 3-tuple from each packet comprising the following items of information: client IP address, client port, and protocol. Classification engine 204 then utilizes this information as a key to access a CAM which is initialized at configuration time. This access yields an entry having the format illustrated in FIG. 9. Referring to FIG. 9, field 902 is a Base Service Index (BSI), indicating the desired class of service for the packet. Field 904 indicates whether layer 4 or layer 5 service is requested for the packet. Field 906 indicates a desired application class for the packet.

The settings of field 902 are application dependent, but some examples of possible services which may be indicated by this field are whether or not the connection is to be SSL-terminated or not, whether the quality of service (QOS) is to be high or low, the priority of the request, if the desired service is a layer 5+ service, the specific layer beyond layer 5 which is involved, the Internet service provider (ISP) to be associated with the connection, e.g., AOL, AKAMAI, YAHOO, CNN, and whether the connection or ISP is to be associated with a high or low level of priority.

Similarly, the settings field 906 are application dependent, but some examples of settings which are possible for this field, include the type of files the connection relates to, e.g., .gif files, text files, etc., or whether the connection is SSL-terminated.

If layer 5 service is requested, the packets are buffered by EMU 300 until a suitable data grouping has been assembled depending on the protocol which is in effect. If the http protocol is in effect, the data grouping comprises a http header. If the https protocol is in effect, the data grouping comprises a SSL record layer followed by an encrypted https string. At present, http versions 0.9, 1.0, and 1.1 and https versions 2.0, 3.0, and 3.1 are supported.

Once assembled, the data grouping is provided to the content analyzer 302 within analysis engine 208. In addition, the information illustrated in FIG. 9, including the BSI and Application Class, is also made available to the content analyzer 302.

Content analyzer 302 analyzes the content of the data grouping. Based on this analysis, as well possibly as the BSI and Application Class, content analyzer 302 determine either an indicator of a desired sub-class of service for the underlying resource request (which may be referred to as the Content Analyzer Service Index ("CSI")) or one or more content identifiers derived from the content of the data grouping. This information may be used by policy engine 206 to identify and allocate a server to the underlying resource request.

Referring to FIG. 8, the content analyzer 302 in this implementation example comprises tokenizer 600, association engine 602, cookie engine 800, and session engine 802. The tokenizer 600 is configured to parse an incoming data grouping into tokens. Association engine 602 is configured to derive the domain and URL path from a http header, and to use this information, in combination with the incoming BSI, to determine a CSI for the http header. Cookie engine 800 is configured to derive a selected cookie value from a http header, and to process this information in accordance with a selected cookie processing mode to arrive at information useful by policy engine 206 for allocating a server to the http header. Session engine 802 is configured to derive a SSL session identifier from a https header, and to output this information to policy engine 206 for use in allocating a server to the https header.

A control register (not shown) may be set by a user to indicate whether cookie engine 800 or session engine 802 should be disabled or not. Switches operative in response to the settings of this control register then selectively disable any of these engines. For example, if an http protocol is in effect, there may be no need for session engine 802 to be active. Therefore, a user can de-activate this engine through suitable settings of the control register. If, on the other hand, a https protocol is in effect, a user can deactivate the cookie engine through suitable settings of the control register.

Tokenizer 600 is configured to parse http headers into tokens. Tokens are items of information which have meaning to one or more of the association engine 602, the cookie engine 800, or the session engine 802 either because they can be used as a key for accessing a database or for some other reason.

The http header syntax which is supported is illustrated in FIGS. 10A-10C. According to this syntax, the following http methods are supported: GET, PUT, POST, HEAD, CONNECTION, OPTION, and TRACE.

The tokenizer 600 is configured to identify the domain within the http header, and parse the domain into tokens. Furthermore, through suitable settings in a control register (not shown), the tokenizer 600 may be configured to search for the domain either within the URL path associated with the header, or associated with the host attribute within the header. Consider, for example, the http header:

GET /www.yahoo.com/san jose/sports.htm
host: www.yahoo.com

In this particular example, the domain www.yahoo.com may be obtained from the URL path /www.yahoo.com/san Jose/sports.htm or the value associated with the host attribute (second line of the method). As another example, consider the following three http methods:

GET san jose/sports.htm
GET sports.htm
GET /sports.htm

The tokenizer 600 is configured to determine that, for each of these methods, the domain is not available in the corresponding URL path, but, instead, must be obtained, if at all, from the value associated with the host attribute.

At present, seven top level domain types are supported: .com, .gov, .edu, .org, .net, .int, and .mil. To locate the domain name in the URL path, the tokenizer 600 maintains counters indicating the number of delimiters it encounters in parsing a http method. At present, the tokenizer 600 maintains a count of the slashes ('/') it encounters and a count of the dots ('.') it encounters. When multiple successive delimiters are encountered, e.g., '///', '//' or '..' the counters are incremented by one. Thus, for example, when 'http://' or 'ftp://' is encountered, the slash counter is incremented by one. Similarly, when 'sports.htm' is encountered, the dot counter is incremented by one.

When the slash counter is equal to two, and the suffix is a supported top level domain type, the text in between the slashes is taken to be the domain name, and the dot counter plus one is taken to be the number of tokens in the domain name. For example, after the text '/www.sports.com/' is scanned, the slash counter equals two, and the dot counter equals one. Since .com is a valid top level domain type, the text 'www.sports.com' is taken to be a valid domain name having three tokens 'www', 'sports', and 'com'. Upon making this determination, tokenizer 600 breaks the text up into three tokens, and pushes the three tokens onto a queue which is accessible by the engines.

When the slash counter is equal to two, and the suffix is not a supported top level domain type, the text in between the slashes is taken to be a portion of a URL path. Again, the contents of the dot counter plus one is taken to be the number of tokens in this text. Tokenizer 600 parses the text into three tokens, and pushes the tokens onto a queue which is accessible by the engines.

Tokenizer 600 also scans the http header for selected attributes such as 'host,' 'cookie,' or 'content_type.' Upon encountering such an attribute, the tokenizer 600 extracts the attribute value, and places it onto the queue.

A URL switch, which can be set by a user in response to suitable settings of a control register, determine whether or not priority should be given to the URL path in determining the domain name for a http header. If so, tokenizer 600 will first attempt to obtain the domain name from the URL path, and will only attempt to obtain the domain from the host attribute value if the domain is unavailable from the URL path.

The method type in the http header is case sensitive and is assumed to be all upper case. The domain name in the header is case insensitive. The URL path is case sensitive. The host, content-type, and cookie attribute values are all case insensitive.

The tokenizer 600 continues scanning until an end of line mark is encountered. At present, the following sequences are recognized as valid end of line marks: <CR>, <LF>, <CR><LF>, and <LF><CR>. Once an end of line mark has been detected, the tokenizer 600 begins scanning the next line. This process continues until the entire http header has been scanned.

Before pushing the tokens onto the queue, however, tokenizer 600 converts the tokens to uniformly sized codes using token dictionary 606. Token dictionary 600 is initialized at configuration time using a configuration table specified by a user. The configuration table indicates an allocation of resources in a server farm. Consider, for example, the following previously described configuration table:

www.myhomepage.com
*.gif
/myhome*.jpg
www.yourhomepage.com/yourhome/*

This configuration table will give rise to the following entries in the token dictionary:

com-1
gif-2
jpg-3
myhomepage-4
myhome-5
www-6
yourhomepage-7
yourhome-8

When the tokenizer 600 encounters a method such as that illustrated in FIG. 11, it will utilize the token dictionary 606 parse this method into the following tokens:

www
myhomepage
com
myhome

All other words in the request are ignored since they are not in the dictionary 606, and are therefore irrelevant.

In addition to parsing the tokens, tokenizer 600 will utilize the token dictionary 606 to represent the tokens in terms of their corresponding codes before storing them in the queue, and making them accessible to the engine. The tokens above will be represented by the following codes:

6
4
1
5

The token dictionary 606 may be implemented as a content addressable memory (CAM) to facilitate rapid access. To determine whether a token is relevant and also to determine its corresponding code, tokenizer 600 uses the token as the key for accessing an entry in the CAM. If the access returns a null value, this indicates that the token is not relevant. Otherwise, the access will return a code which represents the token on the queue.

Note that the tokens are re-ordered according to a pre-defined schema which calls for tokens relating to the domain name to precede those relating to the URL path (other than the domain name).

Tokenizer 600 handles several special cases. For example, if the http header has no host attribute and no URL path specified, e.g., GET /content_type=video/, it will be assigned a default domain and a default URL. Similarly, if the http header has no domain name specified, but specifies a URL path, it will be assigned just a default domain.

Tokenizer 600 also has a provision for handling long strings in URL path specifications. In one example, tokenizer 600 can handle up to 26 URL elements at up to 32 ASCII characters each. Anything beyond this is ignored.

Tokenizer 600 also ignores port numbers which are affixed to domain names. For example, when the domain name 'sports.domain.com: 8080' is encountered, tokenizer 600 will recognize and parse the domain name 'sports.domain.com' but it will ignore the port number 8080 and consume (ignore) all remaining text until the next delimiter.

In addition to port numbers, tokenizer 600 also ignores cgi script information appended to a domain name. Consider, for example, the following http header:

GET http://www.cnn.com:8080/cgi~bin/query: way 68=% 25

When this header is encountered, tokenizer 600 will recognize and parse the domain name 'www.cnn.com' but it will then ignore the port number 8080 and the subsequent script information.

Referring to FIG. 8, association engine 602 assembles a key for the resource request from the combination of the BSI for the request and the domain name and URL path parsed by tokenizer 600 from the resource request. It then uses this key to determine a CSI for the request by accessing database 604, which comprise a plurality of entries which each associates a key value with a CSI. The entries in database 604 may each require exact, prefix, suffix, or combinations of prefix and suffix matches for the URL pathname portion of the key. Consequently, more than one entry in the database may match the key derived from a resource request. A policy is applied to select one of the entries, and the CSI for this entry is assigned to the request.

The following table provides four examples of entries which may appear in database 604. In this table, an exact match path for the URL path may be represented as A, a prefix match for the URL path may be represented as A/*, a suffix match for the URL path may be represented as */B, and a prefix and suffix match for the URL path may be represented as A/*/B, where A and B specify text which is to be matched.

| | | | |
|---|---|---|---|
| $BSI_1$ | $domain_1$ | A/B | $CSI_1$ |
| $BSI_1$ | $domain_1$ | A/B/* | $CSI_2$ |
| $BSI_1$ | $domain_1$ | A/B/C/*/D | $CSI_3$ |
| $BSI_1$ | $domain_1$ | A/B/C/D/E | $CSI_4$ |

The first entry associates the Content Service Index $CSI_1$ with a key value formed from the combination of the Base Service Index $BSI_1$, the domain name $domain_1$, and a URL pathname which is A/B exactly. The second entry associates the Content Service Index $CSI_2$ with a key value formed from the combination of the Base Service Index $BSI_1$, the domain name $domain_1$, and a URL pathname which begins with A/B/C (any suffix is acceptable). The third entry associates the Content Service Index $CSI_3$ with a key value formed from the combination of the Base Service Index $BSI_1$, the domain name $domain_1$, and a URL pathname which begins with A/B/C and ends with D. The fourth entry associates the Content Service Index $CSI_4$ with the Base Service Index $BSI_1$, the domain name $domain_1$, and a URL pathname which is A/B/C/D/E exactly.

If more than one entry matches a key, the entry which controls is the one with the longest URL prefix match. Thus, consider a resource request which has the Base Service Index $BSI_1$, the domain name $domain_1$, and the URL pathname A/B/C/G/D. Entries two and three will both match this request. However, entry three will control, since it implies the longest prefix match. Consequently, the resource request will be assigned the Content Service Index $CSI_3$.

The database 604 may be implemented as a CAM, where each entry in the CAM associates a key comprising a particular BSI, domain, URL path combination with a CSI. Each entry also includes a command which specifies the type of match which is required for the key, and an action to be taken when the specified type of match is detected.

To determine the entries which match a key, the association engine 602 receives each token in the key from left to right, one token at a time. It searches the entries in the CAM iteratively, using, at each iteration, an address comprising the current token combined with all previous tokens. This procedure yields all the entries in the CAM which match the key.

For example, assume the following entries are stored in the CAM:

$BSI_1$, $domain_1$, 6/4/1/*, $CSI_1$, Wildcard hit, Stop $BSI_1$, $domain_1$, 6/4/*/5, $CSI_2$, Wildcard hit, Left continue $BSI_1$, $domain_1$, 6/4/1/3/*, $CSI_3$, Wildcard hit, Stop The first entry specifies that, if there is a wildcard match between the string 6/4/1/* and the URL path for the request, and the BSI and domain for the request are $BSI_1$ and $domain_1$, respectively, then searching should stop, and $CSI_1$ will be assigned to the request. The second entry specifies that, if there is a wildcard match between the string 6/4/* and the URL path for the request, and the BSI and domain for the request are $BSI_1$ and $domain_1$, then searching should continue in reverse towards the left. If there is an ensuing wildcard match between the URL path and the string */5, searching should stop, and $CSI_2$ will be assigned to the request. The third entry specifies that, if there is a wildcard match between the string 6/4/1/3/* and the URL path for the request, and the BSI and domain for the request are BSI.' and $domain_1$, respectively, then searching should stop, and $CSI_3$ will be assigned to the request.

As another example, assume the configuration file indicates that all files of a particular type, i.e., .gif files, are to be stored on the same group of servers. In this event, the following CAM entry can be used to assign requests for such files the same CSI, and therefore, group of servers: BSI, domain, *.gif, Wildcard hit, Stop. Assuming the token string 6, 4, 1, 5 is placed in the queue, the first, second, and third iterations by association engine 602 will yield no hits. However, the fourth iteration utilizing the key 6, 4, 1, 5, will yield matches with the first and second entries. Since the first entry implies the longest prefix match, it will control, and the request will be assigned the Content Service Index $CSI_1$.

The association engine CAM entries may be organized in the form of two tables, a prefix table and a suffix table. FIG. 12 illustrates the format of the prefix table entries. For a prefix table entry, field 1202 specifies a prefix key, field 1204 specifies a command to the association engine 1204 which is executed if there is a match of the prefix key, and field 1206 specifies a CSI which is returned if there is match of the prefix key. Field 1208 is a number of a table which is returned if there is a match of the prefix key. Field 1210 is a byte map which is returned if there is a match of the prefix key.

Field 1202 can accommodate a prefix key of up to 32 bytes. This represents a total of 16 tokens, since each token is represented by 2 bytes.

Field 1204 specifies one of the following commands: Miss Stop, Exact Hit Stop, Wildcard Hit Stop, Left_Continue, Domain_Left_Continue, Exact_Hit_Left_Continue, and Wild_Hit_Left_Continue.

The Miss Stop commands instructs the association engine 602 to stop searching if there is not an exact match of the prefix key.

The Exact Hit Stop command instructs the association engine 602 to stop searching if there is an exact match of the prefix key.

The Wildcard Hit Stop command instructs the association engine 602 to stop searching if there is a wildcard match of the prefix key.

The Left Continue command instructs the association engine 602 to continue searching in reverse, i.e., from right to left, after detecting a match of the prefix key.

The Domain-Left_Continue command instructs the association engine 602 to continue searching in reverse after detecting a match of the BSI+domain portions of the prefix key if there is more to the resource request key. If the reverse search results in a miss, the CSI associated with the prefix table entry will be returned. Otherwise, the CSI associated with the suffix table entry will be returned.

The Exact_Hit_Left_Continue command instructs the association engine 602 to continue searching in reverse after detecting an exact hit of the prefix key and there is more to the resource request key. If the reverse search results in a miss, the CSI associated with the prefix table entry will be returned. Otherwise, the CSI associated with the suffix table entry will be returned.

The Wild Hit_Left_Continue command instructs the association engine 602 to continue searching in reverse after detecting a wildcard hit of the prefix key and there is more to the resource request key. If the reverse search results in a miss, the CSI associated with the prefix table entry will be returned. Otherwise, the CSI associated with the suffix table entry will be returned.

The Field 1208 is the prefix table to be used for the next iteration of the search.

Field 1210 is a byte map which specifies the tokens in the resource request key which are to be used for the next iteration in the search.

For a suffix table entry, field 1202 specifies a suffix key, field 1204 specifies a command to the association engine 1204 which is executed if there is a match of the suffix key, and field 1206 specifies a CSI which is returned if there is match of the suffix key. Field 1208 is a number of a table which is returned if there is a match of the suffix key. Field 1210 is a byte map which is returned if there is a match of the suffix key.

Field 1202 can accommodate a suffix key of up to 32 bytes. This represents a total of 16 tokens, since each token is represented by 2 bytes.

Field 1204 specifies one of the following commands: Miss Stop, Exact Hit

Stop, Wildcard Hit Stop, Left_Continue, Domain_Left_Continue, Exact_Hit_Left_Continue, and Wild Hit_Left_Continue.

The Miss Stop commands instructs the association engine 602 to stop searching if there is not an exact match of the suffix key.

The Exact Hit Stop command instructs the association engine 602 to stop searching if there is an exact match of the suffix key.

The Wildcard Hit Stop command instructs the association engine 602 to stop searching if there is a wildcard match of the suffix key.

The Left Continue, Domain-Left_Continue, Exact_Hit_Left_Continue, and Wild_Hit_Left_Continue commands cannot be used in the suffix table.

The Field 1208 is the suffix table to be used for the next iteration of the search.

Field 1210 is a byte map which specifies the tokens in the resource request key which are to be used for the next iteration in the search.

Through suitable entries in the prefix and suffix tables, a wide variety of matching rules or conditions can be implemented.

Consider, for example, a rule of the following form:

BSI, domain, A/*/D, CSI=0

This rule may be implemented through an entry in the prefix table of the form BSI+domain+A, Left Continue, CSI=0, and a corresponding entry in the suffix table of the form D, Exact Hit Stop, CSI=0. The prefix table entry commands the association engine 602 to continue searching in reverse, i.e., from right to left, after a match of the prefix BSI+domain+A is detected, and the suffix table entry commands the association engine 602 to return a CSI of 0 if a reverse match of the suffix D is detected.

Consider, as another example, rules of the following form:

BSI, domain, A/B, CSI=0
BSI, domain,A/B/*/D, CSI=1

These two rules may be implemented through an entry in the prefix table of the form BSI+domain+A/B, Wild_Hit_Left_Continue, CSI=0, and an entry in the suffix table of the form D, Exact Hit Stop, CSI=1. The prefix table entry commands the association engine 602 to continue searching in reverse after a match of the prefix BSI+domain+A/B is detected and there is more to the key, and to return a CSI of 0 after the prefix match is detected and there is no more to the key. The suffix table entry commands the association engine 602 to return a CSI of 1 after a match of the suffix D is detected.

Three special match conditions can be represented as BSI/domain/*/CSI, BSI/*/*/CSI, and BSI/*/URL/CSI. The first assigns a CSI to a service request based on the combination of BSI and domain, without consideration of the URL pathname. This situation may be handled through an entry in the prefix table of the form BSI+domain, Wildcard Hit Stop, CSI.

The second assigns a CSI to a service request based solely on the BSI. This rule may be handled through a suitable entry in the cookie name table (to be discussed later).

The third assigns a CSI to a service request based on the combination of the BSI and URL pathname, but without consideration of the domain. This situation may be handled through an entry in the prefix table of the form BSI, Left Continue, CSI, and an entry in the suffix table of the form URL, Exact Hit Stop, CSI.

Cookie engine 800 scans the tokens parsed by tokenizer 600, and processes any cookies which have been identified. The tokens which are parsed by tokenizer 600 include the cookie name and the cookie value.

In parsing cookie information, tokenizer 600 is configured to consume (ignore) the following cookie delimiters: ';', ',', and <CR>.

In addition, tokenizer 600 recognizes multiple cookies associated with a cookie attribute. For example, assuming the following string is present in a http header:

cookie: A=xx . . . x, B=yy . . . y, C=zz . . . z;

Tokenizer 600, upon recognizing the cookie attribute, parses the subsequent string into six tokens as follows: A, xx . . . x, B, yy . . . y, C, zz . . . z.

Furthermore, tokenizer 600 also recognizes multiple cookie header fields. For example, assuming the following strings are present in a http header:

cookie: B=xx . . . x, E=yy . . . y, C=zz . . . z;
cookie: A=ww . . . w;

Tokenizer 600 parses these strings into eight tokens as follows: B, xx . . . x, E, yy . . . y, C, zz . . . z, A, ww . . . w.

The cookie engine 800 first accesses cookie name table 804 to determine how to process a cookie. An entry in the cookie name table is illustrated in FIG. 13. Each entry in the table is indexed through a Base Service Index, identified with numeral 1202. The other fields in the entry comprises a cookie mode identifier, identified with numeral 1204, and a cookie name, identified with numeral 1206. Field 1208 is a default CSI which is used to implement the special matching condition BSI/*/*/CSI mentioned above. (It may be recalled that, according to this special condition, the default CSI is assigned to the resource request based solely on the BSI, without consideration of the domain and URL path. This assignment may be over-ridden by another assignment by the association engine 602 which takes account of the domain and/or URL, but the default assignment will remain in effect if not over-ridden.).

For example, assume www.amazon.com is assigned a BSI of 1, www.yahoo.com is assigned a BSI of 2, and www.etrade.com is assigned a BSI of 3. The following entries in the cookie name table specify that (a) the cookie name that is important in the context of www.amazon.com is 'server_id', that the cookie name that is important in the context of www.yahoo.com is 'user_id', and that the cookie name that is important in the context of www.etrade.com is 'password'; (b) the cookie mode to be implemented for www.amazon.com is self identifying mode, the cookie mode to be implemented for www.yahoo.com is directive hash mode, and the cookie mode to be implemented for www.etrade.com is cookie learning mode; and (c) the default CSI for each are the values 4, 5 and 6, respectively:

BSI=1, self-identification mode, 'server_id', CSI=4
BSI=2, directive hash mode, 'user_id', CSI=5
BSI=3, cookie learning mode, 'password', CSI=6

To process a cookie, the BSI for the service request is used by cookie engine 800 to access the corresponding entry in the cookie name table. If there is a cookie in the http header for the request having a name which matches the cookie name recorded in field 1206 of the entry, the cookie value for the cookie is processed according to the cookie processing mode recorded by field 1204.

One of three modes may be specified: self-identification cookie mode, directive hash mode, and cookie learning mode. In self-identification cookie mode, the cookie value following the matched cookie name is the IP/MAC address of a server, e.g., 100.10.9.1. Cookie engine 800 maps a key derived from the combination of the BSI and server IP address into a server identifier. To perform this task, cookie engine 800 utilizes serverIP-serverID mapping table 806, the entries of which associate values of the key with server identifiers. Cookie engine 800 locates the entry which corresponds to a particular key value, and returns the server identifier contained in the entry. Policy engine 602 then allocates the server identified by this identifier to the resource request to implement a persistence policy known as self-identification stickiness.

In directive hash mode, a hash function is applied to the cookie value following the matched cookie name, and the resulting hash value is output by the cookie engine 800. This value is then utilized by policy engine 206 in combination with the CSI output by association engine 602 to identify and allocate a server to the resource request. In particular, as explained in U.S. patent application Ser. Nos. 10/073,483 and 10/075,051, previously incorporated by reference, the policy engine 206 maintains a server index table associating values of a service index (BSI or CSI) with server super groups and load balancing policies, a super group table associating server super groups with server groups, and a server group table associating server groups with individual servers. Policy engine 602 uses the CSI for the resource request as an index into the service index table to identify a super group and a load balancing policy. It then uses the identified super group value as an index into the super group table to identify the server groups within the identified super group. It then selects one of these server groups using the lower 7 bits of the sum of the CSI and the hash of the cookie value. It then identifies the servers within the selected server group using the server group table, and it selects one of the servers within the selected server group using the upper 7 bits of the sum of the CSI and the hash of the cookie value. Policy engine 206 then allocates this server to the resource request to implement a persistence policy known as cookie hashing stickiness.

In cookie learning mode, a cookie identifier is derived from the cookie value following the matched cookie name, and this cookie identifier is output by the cookie engine 800. As explained in U.S. patent application Ser. Nos. 10/073,483 and 10/075,051, previously incorporated herein by reference, policy engine 206 uses a hash of the cookie identifier as an index into a history table of current and recently expired connections to determine if there is a current or recently expired connection which corresponds to the cookie identifier. If so, the server associated with this connection is allocated to the resource request in accordance with a persistence policy known as cookie ID-based persistence. If not, policy engine 206 uses a hash of the client IP address associated with the resource request as an index into the history table to determine if there is a current or recently expired connection which corresponds to the client IP address. If so, the server associated with this connection is allocated to the resource request in accordance with a persistence policy known as client IP-based persistence. If not, a server is allocated to the request based on application of a suitable load balancing policy (selected using the CSI for the request as the index to the service index table). Policy engine 206 then updates the history table to reflect the newly created connection, and ensures that there are two entries reflecting the new connection, one corresponding to the cookie identifier, and one corresponding to the client IP address.

Cookie engine 800 will return a default cookie value if a default cookie identifier mode is specified by field 1206 of the cookie name table 804, or the cookie name specified by field 1206 is not found in the http header, or if the mapping performed by server IP-server ID mapping table 806 fails. Policy engine 206 will use a hash of this default cookie value as an index to the history table to determine if there is a current or recently expired connection which corresponds to the default cookie value. If so, the server associated with this connection is allocated to the resource request in accordance with a cookie-ID based persistence policy. If not, the policy engine 206 uses a hash of the client IP address for the resource request as an index to the history table to determine if there is a current or recently expired connection which corresponds to the client IP address. If so, the server associated with the connection is allocated to the resource request in accordance with a client IP address-based persistence policy. If not, a server is allocated to the request based on application of a suitable load balancing policy (selected using the CSI for the request as the index to the service index table). Policy engine 206 then updates the history table to reflect the newly created connection, and ensures that there are two entries reflecting the new connection, one corresponding to the default cookie value, and one corresponding to the client IP address.

The session engine 802 is configured to handle https headers, which comprise a SSL record layer followed by encrypted http text. The format of a SSL record layer differs by version. At present, versions 2.0, 3.0, and 3.1 are supported.

The session engine 802 scans incoming https headers to detect a particular handshaking message known as a Client Hello message. (Hello messages can also originate from the server, but, at present, session engine 802 only scans for the Client Hello messages).

Included within the Client Hello message is a session ID string. This string is assigned by the SSL server to the client in the first SSL session. The client then sends this unencrypted string to the server during the handshake phase of each subsequent new session. This is how the session ID string comes to be present in the Client Hello message.

For SSL version 2.0, the session engine 802 monitors the Message Type field within the https record layer. If this field indicates that a Client Hello message is present, session engine 802 then extracts the Session-ID length field, which indicates the length of the Session-ID string. The Session-ID string is a known offset from the start of the message. The session engine 802 utilizes this known offset in conjunction with the Session-ID length which it previously extracted to extract the Session-ID string from the message.

For SSL version 3.0 and 3.1, the session engine 802 monitors the Content Type and Handshake type fields within the https record layer. When the Content Type field indicates that the message is a handshake, and the Handshake type field indicates that the message is a Client Hello handshake message, the session engine 802 then extracts the Session ID length field which is a known offset from the start of the message. Session engine 802 then utilizes this information, in conjunction with the known offset of the start of the Session ID string field, to extract the Session ID string from the message.

Since a https header does not have a domain or UPS, the CSI foe the header is derived solely from the BSI using the cookie name table. This CSI, in conjunction with the Session ID string, is then provided to the policy engine 206.

Policy engine 206 will use a hash of the Session ID as an index to the history table to determine if there is a current or recently expired connection which corresponds to the session ID. If so, the server associated with this connection is allocated to the resource request in accordance with a session-ID based persistence policy. If not, the policy engine 206 uses a hash of the client IP address for the resource request as an index to the history table to determine if there is a current or recently expired connection which corresponds to the client IP address. If so, the server associated with the connection is allocated to the resource request in accordance with a client IP address-based persistence policy. If not, a server is allocated to the request based on application of a suitable load balancing policy (selected using the CSI for the request as the index to the service index table). Policy engine 206 then updates the history table to reflect the newly created connection, and ensures that there are two entries reflecting the new connection, one corresponding to the session ID, and one corresponding to the client IP address.

Note that there are three control bits maintained in a control register within content analyzer 302 which allow any of the association, cookie, or session engines 602, 800, 802 to be disabled or bypassed. In particular, a URL switch can be used to disable or bypass the association engine 602; a cookie switch can be used to disable or bypass the cookie engine 800; and a session switch can be used to disable or bypass the session engine 802.

When http headers are being received, these switches can be used to disable or bypass the session engine 802, since the session identifier information is not available for these headers. Similarly, when https headers are being received, these switches can be used to disable or bypass the association engine 602 and the cookie engine 800, since domain, URL pathname, and cookie information is not available for these headers.

Once the content analyzer 302 has finished processing a header, it assembles its various outputs into a data block, and communicates this data block to the policy engine 206.

Figure 14:
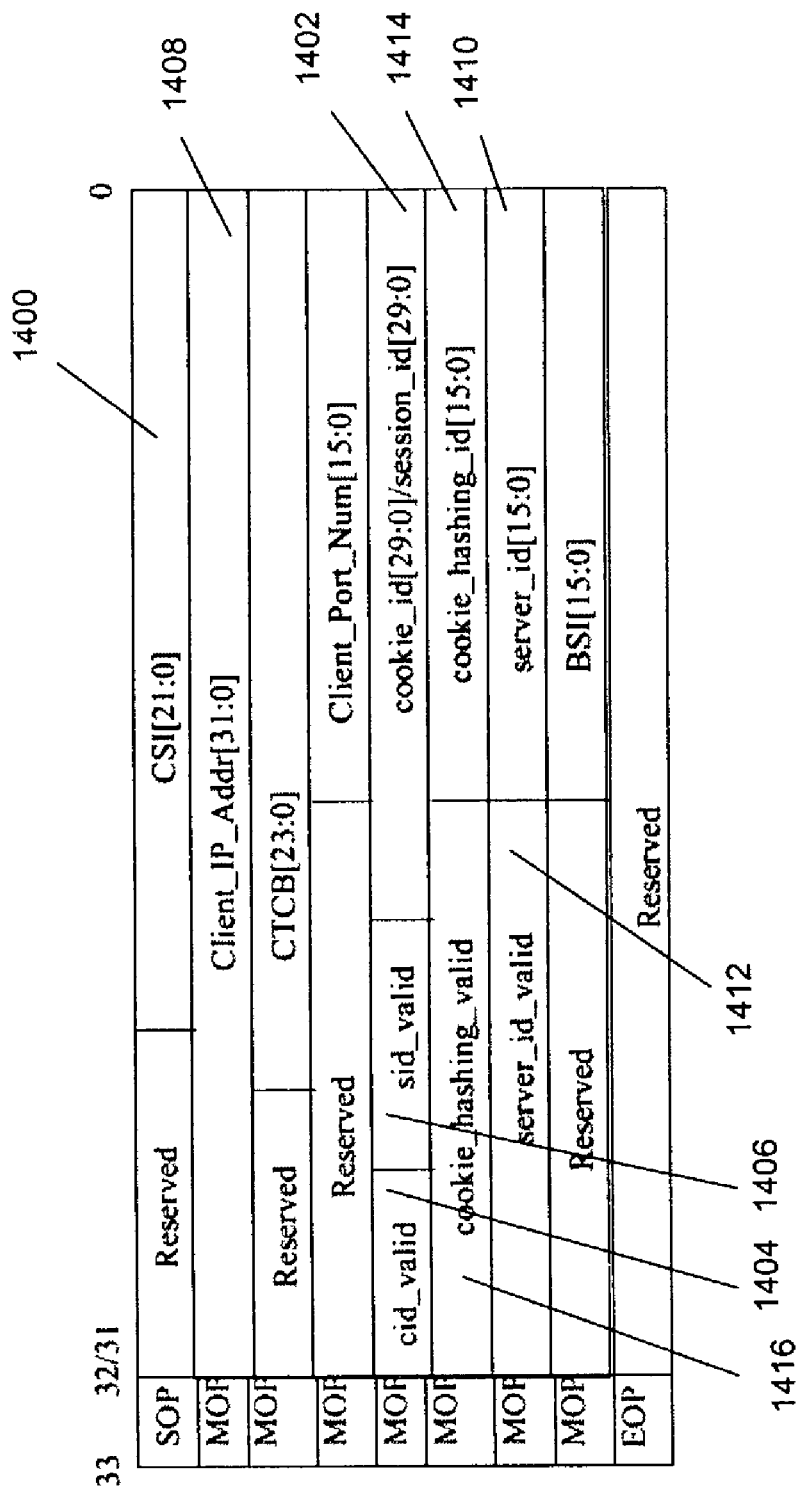
FIG. 14 illustrates an example format of a communication between the analysis and policy engines in the system of FIG. 2.

Referring to FIG. 14, the format of this data block is illustrated. Field 1400 is the CSI for the resource request. Field 1408 is the client IP address of the client which issued the resource request. Field 1404 is an indicator of whether field 1402 is valid and contains a cookie identifier. Field 1406 is an indicator of whether field 1402 is valid and contains a session identifier. Field 1416 is an indicator of whether field 1414 is valid and contains a hash of a cookie value. Field 1412 is an indicator of whether field 1410 is valid and contains a valid server identifier.

FIG. 15 is a table indicating the interrelationship and possible settings of the fields in this data block. As indicated by entry 1502 in the table of FIG. 15, when a SSL connection is present, a session identifier, equal to a hash of the SSL Session ID string extracted by session engine 802, is placed in field 1402, and sid_valid field 1406 is set to a logical '1' to indicate that field 1402 is valid and contains a valid session identifier. Cid_valid field 1404, cookie_hashing_valid field 1416, and server_id_valid field 1412 are each reset to a logical '0'.

As indicated by entry 1504 in the table of FIG. 15, when the http protocol is in effect, any of the cookie processing modes is enabled, but a valid cookie is not found in the http header, a default cookie identifier is placed in field 1402, and the cid_valid field 1404 is set to a logical '1' to indicate that field 1402 is valid and contains a valid cookie identifier. Sid_valid field 1406, cookie_hashing_valid field 1416, and server_id_valid field 1412 are each reset to a logical '0', and the CSI is placed in field 1400.

As indicated by entry 1506 in the table of FIG. 15, when the http protocol is in effect, the cookie learning mode is enabled, and a valid cookie is found in the http header, a cookie identifier, equal to a hash of the cookie value, is placed in field 1402, and cid_valid field 1404 is set to a logical '1' to indicate that field 1402 is valid and contains a cookie identifier. Sid_valid field 1406, cookie_hashing_valid_field 1416, and server_id_valid field 1412 are each reset to a logical '0', and the CSI is placed in field 1400.

As indicated by entry 1508 in the table of FIG. 15, when the http protocol is in effect, the directive hash mode is enabled, and a valid cookie is found in the http header, a cookie hashing identifier, equal to a hash of the combination of the cookie value, is placed in field 1414, and cookie_hashing_valid field 1416 is set to a logical '1' to indicate that field 1414 is valid and contains cookie hashing information. Cid_valid field 1404, sid_valid_field 1406, and server_id_valid_field 1412 are each reset to a logical '0', and the CSI is placed in field 1400.

As indicated by entry 1510 in the table of FIG. 15, when the http protocol is in effect, the self identifying mode is enabled, a valid cookie is found in the http header, but a valid match in the SIPSID table 806 is not found, a default cookie identifier is placed in field 1402, and cid_valid field 1404 is set to a logical '1' to indicate that field 1402 is valid and contains a cookie identifier. Sid_valid_field 1406, cookie_hashing_valid field 1416, and server_id_valid field 1412 are each reset to a logical '0', and the CSI is placed in field 1400.

As indicated by entry 1512 in the table of FIG. 15, when the http protocol is in effect, the self identifying mode is enabled, a valid cookie is found in the http header, and a valid match is found in the SIPSIS table 806, a server identifier, derived from the matching entry in SIPSID table 806 using the combination of the cookie value and the BSI as the key, is placed in field 1410, and server_id_valid field 1412 is set to a logical '1' to indicate that field 1410 is valid and contains a server identifier. Cid_valid field 1404, sid_valid_field 1406, and cookie_hashing_valid field 1416 are each reset to a logical '0', and the CSI is placed in field 1400.

As indicated by entry 1514 in the table of FIG. 15, when the http protocol is in effect, but none of the cookie processing modes are enabled, cid_valid field 1404, sid_valid field 1406, cookie_hashing_valid field 1416, and server_id_valid field 1412 are each reset to a logical '0', and the CSI is placed in field 1400.

When the data block of FIG. 14 is received, policy engine 206, determines whether to apply a persistence policy, examples of which are as follows:

| Policy | Description |
| --- | --- |
| Self-identification Cookie Stickiness | For layer 5 requests only, the server ID will be extracted from cookie information, and assigned to the request. |
| Cookie Hashing Stickiness | For layer 5 requests only, a hash value will be derived from cookie information, and a hash algorithm translates this hash value into a server, which is assigned to the request if the same service is requested. |
| Client-Based Persistence (Learned) | For layer 4 and layer 5 requests, the client IP address is used to determine the server the client was connected to before, and that server is allocated to the client. |

-continued

| Policy | Description |
| --- | --- |
| Cookie-ID Based Persistence (Learned) | For layer 5 requests only, cookie information stored by a client is analyzed to determine the server that issued the cookie, and that server is allocated to the client. |
| (SSL) Session-ID Based Persistent (Learned) | For layer 5 requests only, session information stored by a client is analyzed to determine the server that issued the session information, and the server is allocated to the client. |

For purposes of this disclosure, the terms "persistence" and "stickiness" are used synonymously when referring to resource allocation (and this use of the term "persistence" may differ from its meaning in http in relation to a "keep connection alive" command).

According to self-identification stickiness, the server identifier (field 1410 in FIG. 14) is used by policy engine 206 to identify a server for allocating to the request. According to cookie hashing stickiness, the hash value (field 1410 in FIG. 14) is used to identify a server for allocating to the request. According to client based persistence, the client IP address (field 1408 in FIG. 14) is used to connect the client which issued the request to the server previously connected to the client. According to cookie identifier based persistence, the cookie identifier (field 1402 in FIG. 14) is used to connect the client which issued the request to the server which issued the cookie. According to SSL session identifier based persistence, the SSL session identifier (field 1402 in FIG. 14) is used to connect the client which issued the request to the server which issued the session identifier.

The fields 1404, 1406, 1412, and 1416 are used by policy engine 206 to determine whether and which persistence policy to apply. If field 1412 is set, policy engine 206 applies the self identifying policy, and allocates the server identified by field 1410 to the request. If field 1416 indicates that field 1414 contains a valid cookie hashing value, policy engine 206 applies the cookie hash stickiness policy using the value in field 1414 to identify and allocate a server to the request.

If field 1404 indicates that field 1402 contains a valid cookie identifier, policy engine 206 will apply the cookie ID based persistence policy using the value in field 1402 to attempt to identify and allocate a server to the request. If unsuccessful, policy engine 206 will then attempt to identify and allocate a server to the request through application of the client IP based persistence policy, and, if unsuccessful, do so based on application of a load balancing policy using the CSI for the request as the index into the service index table (using the procedure described in U.S. patent application Ser. No. 10/074,462, previously incorporated by reference).

If field 1404 indicates that field 1402 contains a valid SSL session identifier, policy engine 206 will apply the SSL session ID based persistence policy using the value in field 1402 to attempt to identify and allocate a server to the request. If unsuccessful, policy engine 206 will then attempt to identify and allocate a server to the request through application of the client IP based persistence policy, and, if unsuccessful, do so based on application of a load balancing policy using the CSI for the request as the index into the service index table.

If neither of fields 1404, 1406, 1416, or 1412 are set, policy engine 206 will identify and allocate a server to the resource request based on application of a load balancing policy using the CSI for the request as the index into the service index table.

Finite State Machine Implementation Example

In one example, the content analyzer 302 may be implemented in hardware as one or more finite state machines. Moreover, the finite state machines may in turn each be implemented in a variety of forms. Some examples of the implementations which are possible include a field programmable gate array (FPGA), application-specific integrated circuit (ASIC), application specific standard product (ASSP), CPLD, or EPLD implementations. Such hardware implementations are advantageous since, compared to pure software implementations, for a moderate cost in terms of loss of flexibility, they avoid the bottlenecks of pure software implementations, have a higher throughput, and a scaleable to applications requiring a much greater number of simultaneous connections.

The control and state registers for one example of finite state machine implementations of content analyzer 302 is described and illustrated in U.S. Provisional Application No. 60/335,922, previously incorporated herein by reference.

Embodiments of Methods According to the Invention

Figure 16A:
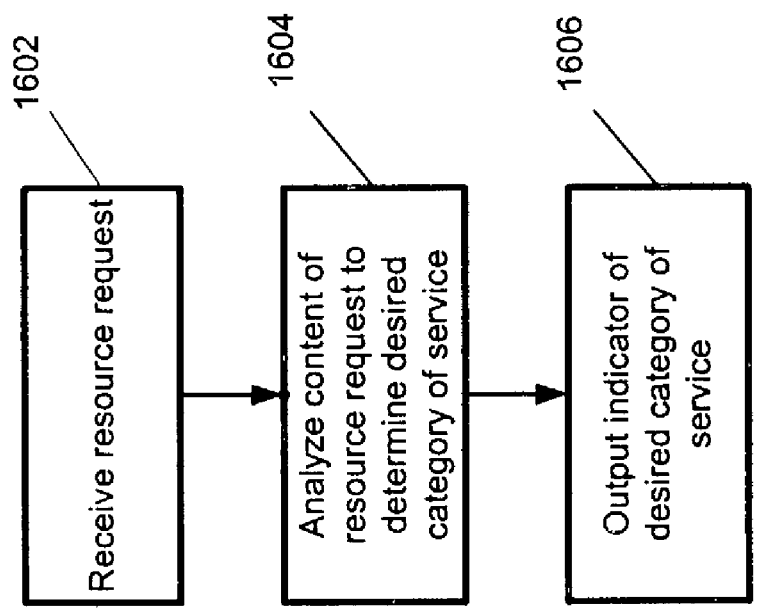
FIG. 16A is a simplified flowchart of one embodiment of a method of determining a desired category of service from a resource request.

Referring to FIG. 16A, a first embodiment of a method according to the invention is illustrated. As illustrated, in this embodiment, the method comprises step 1602, which in turn comprises receiving a resource request along with an indicator of the desired class of service for the resource request. In one implementation, the resource request may be represented by or spawn a data grouping which encapsulates one or more packets. In one implementation example, the data grouping comprises a http or https header. The indicator of the desired class of service may comprise a Base Service Index (BSI).

The method also comprises step 1604 which in turn comprises analyzing the content of the resource request to determine a desired sub-class of service. In one implementation, this step comprises deriving the domain and URL path from the data grouping, forming a key with this information in combination with the BSI, and using this key to access a database associating values of the key with values of an indicator of the desired sub-class of service referred to as the Content Based Service Indicator CSI). The access yields an entry in the database corresponding to the key, and the CSI for the resource request is then derived from this entry.

The method also comprises step 1606 which in turn comprises outputting an indicator of the desired sub-class of service which, in one implementation, is the CSI.

Figure 16B:
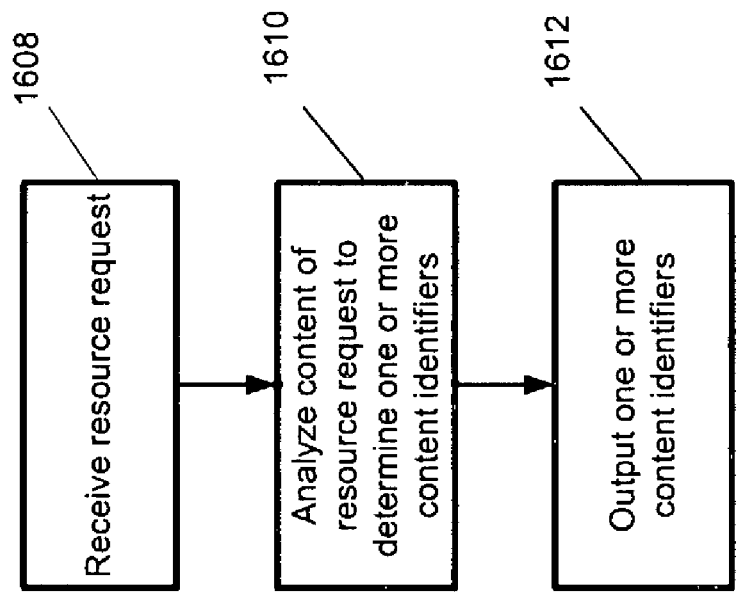
FIG. 16B is a simplified flowchart of one embodiment of a method of determining one or more content identifiers from a resource request.

Referring to FIG. 16B, a second embodiment of a method according to the invention is illustrated. As illustrated, the method comprises step 1608, which in turn comprises receiving a resource request and an indicator of the desired class of service for the request. As in the first embodiment, the resource request may be represented or spawned by a data grouping, and the indicator of the desired class of service may be a BSI. The data grouping may be a http or https header.

The method also comprises step 1610 which in turn comprises analyzing the content of the data grouping to determine one or more content identifiers. In one example, the data grouping is a http header, and the content identifier is information derived from the http header relating to a cookie. Examples include a service identifier derived from a cookie value, a cookie identifier derived from a cookie value, and a server identifier derived from a cookie value. In another example, the data grouping is a https header, and the content identifier is information derived from the SSL record layer relating to a session. For example, the information may be a SSL session identifier derived from the SSL session ID string in turn derived from the https record layer.

The method further comprises step 1612 which in turn comprises outputting the one or more content identifiers determined in step 1610.

In one configuration, appropriate for use with http headers, step 1610 comprises using the BSI as a key to access a database, the entries of which associate values of the key with a cookie name and a cookie processing mode. This access yields an entry in the database, and this entry yields a cookie name and cookie processing mode for the resource request. The http header is then examined to determine if a cookie having the specified name is present in the header. If so, the cookie value associated with the specified cookie name is extracted and processed in accordance with the specified cookie processing mode.

If the specified cookie processing mode is the self-identification mode, a key is formed from the combination of the cookie value and the BSI, and this key is used to access a table, the entries of which associate values of the key with server identifiers. This access yields an entry in the table, and this entry yields a server identifier corresponding to the key which is formed. In step 1612, this server identifier is output.

If the specified cookie processing mode is the directive hash mode, a service identifier is formed from a hash of the cookie value and the CSI for the request. This service identifier is then output in step 1612.

If the specified cookie processing mode is the cookie learning mode, a cookie identifier is formed from a hash of the cookie value. This cookie identifier is then output in step 1612.

If a cookie processing mode is specified, but a cookie with the specified name is not found in the header, or if the self identifying mode is specified, but the mapping into a server identifier fails, a default cookie identifier is determined and then output in step 1612.

Figure 16C:
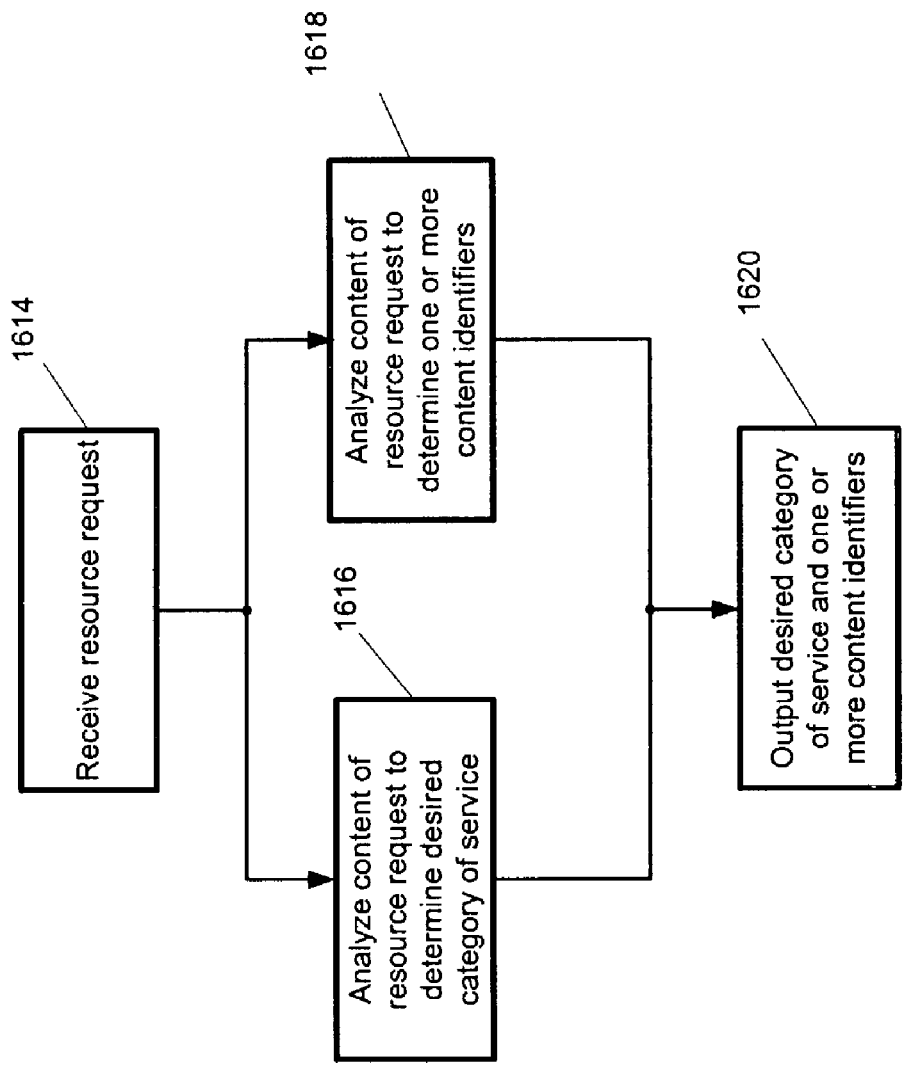
FIG. 16C is a simplified flowchart of one embodiment of a method of determining in parallel a desired category of service and one or more content identifiers from a resource request.

Referring to FIG. 16C, a third embodiment of a method according to the invention is illustrated. As illustrated, the method comprises step 1614 which in turn comprises receiving a resource request and an indicator of a desired class of service for the request. As with the previous embodiments, the resource request may be represented by or spawn a data grouping such as a http or https header, and the indicator of the desired class of service for the request may be a BSI.

The method further comprises steps 1616 and 1618 which may be performed in parallel (an alternative embodiment is possible in which these two steps are performed serially). In step 1616, the content of the resource request is analyzed to determine a desired sub-class of service. In one example, this step yields an indicator of the desired sub-class of service such as a CSI. This step may be performed in like manner to step 1604, discussed above in relation to the first embodiment illustrated in FIG. 16A. In step 1618, the content of the resource request is analyzed to determined one or more content identifiers. This step may be performed in like manner to step 1610, discussed above in relation to the second embodiment illustrated in FIG. 16B.

The method further comprises step 1620 which in turn comprises outputting an indicator of the desired sub-class of service as determined in step 1616, and the one or more content identifiers as determined in step 1618. For a resource request represented by a http header, this step may comprises outputting a CSI derived from the BSI in combination with the domain name and URL extracted from the http header, and also outputting cookie information derived from the header. In one example, depending on the specified cookie processing mode, this cookie information may comprise a server identifier derived from the BSI in combination with the value of a specified cookie in the header, a service identifier derived from the CSI in combination with the value of a specified cookie in the header, or a cookie identifier derived from the value of a specified cookie in the header. This cookie information may also comprise a default cookie identifier which may be provided if a cookie processing mode is specified by the specified cookie is not present in the header, or if the self-identification mode is specified, but a server identifier cannot be derived from the BSI in combination with the value of the specified cookie.

For a resource request represented by a https header, this step may comprise outputting a default CSI derived from the BSI for the request, and a session identifier derived from a SSL session ID string extracted from the SSL record layer for the header.

Figure 17:
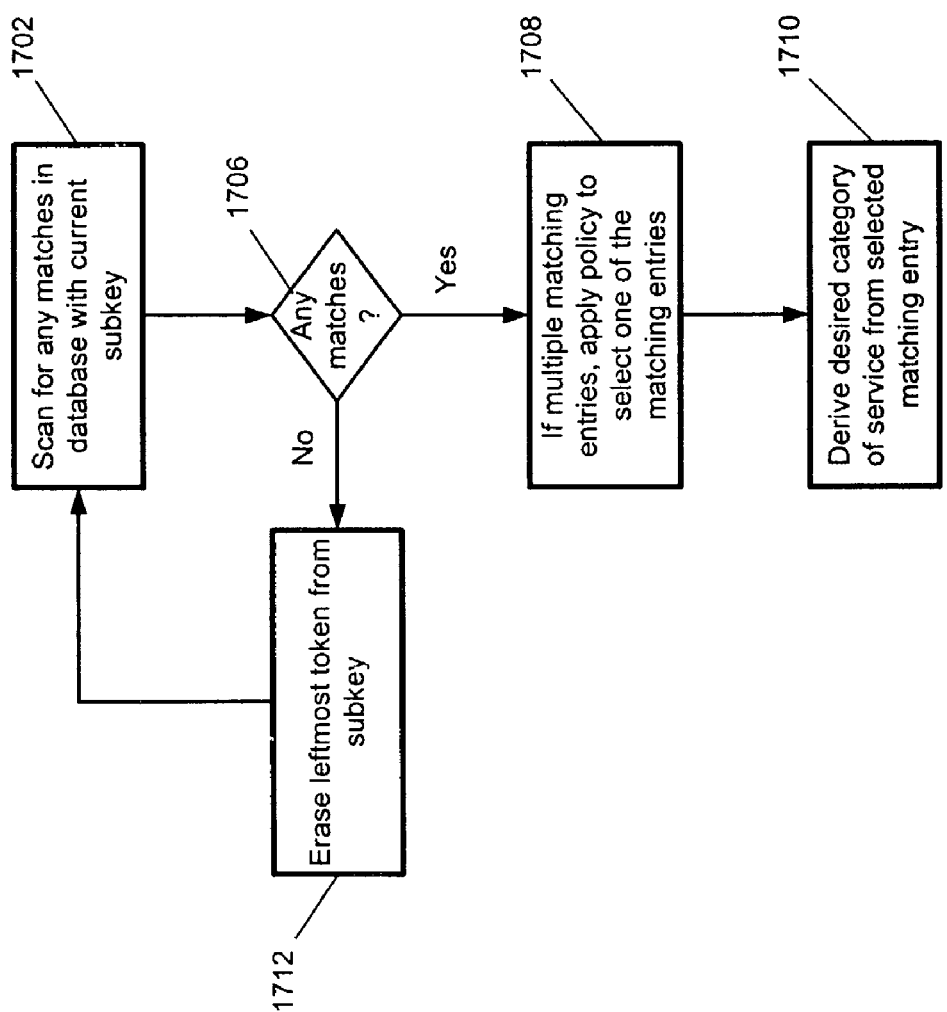
FIG. 17 is a simplified flowchart of one embodiment of a method of iteratively searching a database associating value of keys and sub-keys with categories of service using sub-keys derived from the content of the resource request.

Referring to FIG. 17, an embodiment of a method for determining a desired sub-class of service for a resource request is illustrated. It is assumed that a key has been derived from a resource request and divided into tokens, and that a database is accessible which associates values of the key and sub-combinations of the key (through wildcard matching) with desired sub-classes of service. In one example, an entry in the database may specify an exact or a wildcard match, and the wildcard match which may be specified can be a prefix match, a suffix match, or combinations of the two. In one configuration, the database may be embodied as one or more prefix tables and one or more suffix tables.

The method is iterative, and involves starting with a sub-key comprising all tokens. The database is accessed to determine if there are any matches. If so, and there is a single match, the desired sub-class of service for the resource request is derived from the matching entry. If there are multiple matches, a policy is applied to select one of the matching entries, and the desired sub-class of service derived from the selected entry. If there are no matches, the method continues to iterate until a match is found. During each iteration, a sub-key, derived by erasing the right-most token from the sub-key used during the previous iteration, is used to access the database and determine if there are any matching entries. If there is a match, the desired sub-class of service is derived as discussed above. If not, the method continues to iterate. As illustrated, the method comprises step 1702 which in turn comprises scanning the database for any matches with the current sub-key.

In query step 1706, a query is made whether there are any matches. If not, the method jumps to step 1712, which comprises erasing the right-most token from the current sub-key. From step 1712, the method jumps back to step 1702 for another iteration.

Turning back to query step 1706, if a match has been detected, the method jumps to step 1708, which comprises applying a suitable policy to select one of the database entries if multiple matches have been detected. (This step is by passed if only one matching entry has been detected).

From step 1708, the method proceeds to step 1710. In step 1710, the desired sub-class of service is derived from the entry selected in step 1708, or if there was only a single entry, from that entry.

To illustrate the application of this method, assume that an initial sub-key is formed from the combination of a BSI for a resource request, a domain name derived from the resource request, and the following tokens relating to the URL path which have been derived from the resource request:

K, T, Z, P, L, B

Assume further that the database is embodied as a prefix table and a suffix table, and that the prefix table has entries of the following form:

BSI+domain, Domain_Left_Continue, $CSI_1$
BSI+domain+K/T/Z, Exact_Hit_Stop, $CSI_2$
BSI+domain+K/T/Z/P, Exact_Hit_Left_Continue, $CSI_3$
BSI+domain+K/T/*, Wildcard_Hit_Stop, $CSI_4$
BSI+domain+K/*, Wildcard_Hit_Left_Continue, $CSI_5$.

Assume further that the suffix table has corresponding entries of the following form:

B/L/*, Wildcard_Hit_Stop, $CSI_6$
N/A
Q/X/*, Wildcard_Hit_Stop, $CSI_7$
N/A
B/*, Wildcard_Hit_Stop, $CSI_8$ During the first iteration, the sub-key is BSI+domain+K/T/Z/P/L/B. This yields a match with the first, fourth, and fifth entries in the prefix table. The first entry calls for a reverse search through the corresponding first entry of the suffix table, and for a return of $CSI_1$ if the reverse search fails. This reverse search yields a match, and thus calls for a return of $CSI_6$.

The fourth entry calls for a return of $CSI_4$.

The fifth entry calls for a reverse search through the corresponding fifth entry in the suffix table, and for a return of $CSI_5$ if the reverse search fails. This reverse search yields a match and thus calls for a return of $CSI_8$.

The fourth iteration yields an additional match with the second prefix table entry. The second entry calls for a return of $CSI_2$. Since the first iteration yielded a match, no addition iterations are performed.

The match results resulting from the first iteration may be summarized as follows:

BSI+domain+*/L/B, $CSI_6$
BSI+domain+K/T*, $CSI_4$
BSI+domain+K/*/B, $CSI_8$

A policy is then applied to select one of these matches. In one example, the policy which is applied is to select the match which implies the longest prefix match. If this policy is applied, the second match is selected since it implies a prefix match of K/T, which is the longest one of all the matching entries. Since this match is selected, the CSI which is returned for the resource request is $CSI_4$.

As another example, assume that the following tokens are derived from the resource request: K, T, Z. In this case, the sub-key which is used during the first iteration is BSI+domain+K/T/Z. This sub-key yields matches with the first, second, fourth and fifth prefix table entries, so no iterations are performed. The reverse search called for by the first entry fails, so the first entry returns $CSI_1$. The second entry returns $CSI_2$. The fourth entry returns $CSI_4$. The reverse search called for by the fifth entry fails, so the fifth entry returns $CSI_5$.

These matches may be summarized as follows:

BSI+domain+*, $CSI_1$
BSI+domain+K/T/Z, $CSI_2$
BSI+domain_K/T/*, $CSI_4$
BSI+domain+K/*, $CSI_5$ Since the second entry implies the longest prefix match, it will control, and $CSI_2$ will be assigned to the resource request.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. A processor device-implemented method of determining an indicator of a desired sub-class of service for resource requests, the method comprising performing the following steps in, by or for one or more processor devices:

receiving the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet;

when the indicator of the desired class of service for the request indicates the desired class of service is at a layer in an applicable reference model corresponding to the OSI layer 4, refraining from performing content analysis processing of the resource request;

when the indicator of the desired class of service for the request indicates the desired class of service is at a layer in an applicable reference model corresponding to the OSI layer 5 or higher, performing content analysis processing of the resource request comprising the following sub-steps:

deriving a key from either or both the indicator of the desired class of service and content of the resource request, the content comprising at least a portion of the packet, or a segment encapsulating the packet, at a layer in an applicable reference model corresponding to the OSI layer 5 or higher;

using the key to access a database comprising entries associating match portions of key values with indicators of a desired sub-class of service, wherein each of a plurality of the entries indicates both type of match and action to be taken upon the type of match occurring, the type of match selected from the group consisting of an exact match, and at least one wildcard match, and the action to be taken upon the type of match occurring selected from the group consisting of stop searching and continue searching; and when one or more matching database entries are located, deriving the indicator of the desired sub-class of service for the resource request from one or more of the matching entries, wherein, the resource request comprises an https header, and the key from the resource request having an https header is derived solely from the indicator of the desired class of service, and the content analysis processing of the resource request further comprises extracting a SSL identifier string from the https header for allocating a resource to the resource request.

2. The method of claim 1 wherein one or more of the matching entries represent exact matches.

3. The method of claim 1 wherein one or more of the matching entries represent wildcard matches.

4. The method of claim 3 wherein one or more of the wildcard matches represent prefix matches.

5. The method of claim 3 wherein one or more of the wildcard matches represent suffix matches.

6. The method of claim 3 wherein one or more of the wildcard matches represent one or more combinations of prefix and suffix matches.

7. The method of claim 1 further comprising applying a policy to select one of a plurality of matching entries, and deriving the indicator of the desired sub-class of service from the selected entry.

8. The method of claim 1 further comprising iteratively locating matching entries using sub-keys derived from content of the resource request.

9. The method of claim 8 wherein the sub-keys are successively derived from content of the resource request.

10. The method of claim 1 wherein the database is embodied as one or more prefix tables each associating values of prefix sub-keys with indicators of desired sub-classes of service.

11. The method of claim 1 wherein the database is embodied as one or more suffix tables each associating values of suffix sub-keys with indicators of desired sub-classes of service.

12. The method of claim 1 wherein the key is embodied as one or more uniformly sized codes.

13. The method of claim 1 further comprising providing a default indicator of a desired sub-class of service if no key or only a partial key is available.

14. The method of claim 1 wherein the key comprises a domain name derived from the resource request.

15. The method of claim 14 wherein the domain name is derived from a host attribute specified in the resource request.

16. The method of claim 14 wherein the key further comprises a URL path derived from the resource request.

17. The method of claim 1 wherein the key further comprises a domain name and a URL path.

18. The method of claim 1 wherein either or both the indicator of the desired class of service and the desired sub-class of service are used for allocating a resource to the resource request based on application of a suitable load balancing or persistence policy.

19. The method of claim 1 wherein the key comprises the indicator of the desired class of service combined with one or more header tags.

20. The method of claim 19 wherein the one or more header tags are http header tags.

21. The method of claim 20 wherein the one or more http header tags comprise either or both a domain name and a URL pathname.

22. A processor device-implemented method of determining an indicator of a desired sub-class of service for, and one or more content identifiers from, resource requests, the method comprising performing the following steps in or by one or more processor devices:
receiving the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet;
when the indicator of the desired class of service for the request indicates the desired class of service is at a layer in an applicable reference model corresponding to the OSI layer 4, refraining from performing content analysis processing of the resource request;
when the indicator of the desired class of service for the request indicates the desired class of service is at a layer in an applicable reference model corresponding to the OSI layer 5 or higher, performing content analysis processing of the resource request comprising the following sub-steps:
deriving the indicator of the desired sub-class of service by matching first content of the resource request with one or more entries of a database associating match portions of content with indicators of a desired sub-class of service, wherein each of a plurality of the entries indicates both type of match and action to be taken upon the type of match occurring, the type of match selected from the group consisting of an exact match, and at least one wildcard match, and the action to be taken upon the type of match occurring selected from the group consisting of stop searching and continue searching, the first content comprising at least a portion of the packet, or a segment encapsulating the packet, at a layer in an applicable reference model corresponding to the OSI layer 5 or higher; and
deriving, in parallel with previous deriving step, the one or more content identifiers from an analysis of second content of the resource request that is distinct from the first content at least in part, the one or more content identifiers, the second content comprising at least a portion of the packet, or a segment encapsulating the packet, at a layer in an applicable reference model corresponding to the OSI layer 5 or higher,
wherein either or both the indicator of the desired sub-class of service, and the one or more content identifiers, are useful for allocating a resource, comprising a connection to a server or class of server, to the resource request,
wherein the first content is selected from the group consisting of domain name information and URL path information, and the second content is selected from the group consisting of cookie information and SSL session information.

23. The method of claim 22 wherein the one or more content identifiers are used for allocating a resource to the resource request based on application of a persistence policy.

24. A processor device-implemented method of allocating resources to resource requests comprising performing the following steps in or by one or more processor devices:
receiving the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet;
when the indicator of the desired class of service for the request indicates the desired class of service is at a layer in an applicable reference model corresponding to the OSI layer 4, refraining from performing content analysis processing of the resource request;
when the indicator of the desired class of service for the request indicates the desired class of service is at a layer in an applicable reference model corresponding to the OSI layer 5 or higher, performing content analysis processing of the resource request comprising the following sub-steps:
when the request comprises an http header, deriving an indicator of a desired sub-class of service by matching first content of the resource request with one or more entries of a database associating match portions of content with indicators of a desired sub-class of service, each of a plurality of the entries indicating both type of match and action to be taken upon the type of match occurring, the type of match selected from the group consisting of an exact match, and at least one wildcard match, and the action to be taken upon the type of match occurring selected from the group consisting of stop searching and continue searching, the first content comprising at least a portion of the packet, or a segment encapsulating the packet, at a layer in an applicable reference model corresponding to the OSI layer 5 or higher;

when the request comprises an http or https header, deriving one or more content identifiers from an analysis of second content of the resource request that is distinct from the first content, the second content comprising at least a portion of the packet, or a segment encapsulating the packet, at a layer in an applicable reference model corresponding to the OSI layer 5 or higher; and allocating a resource to the resource request, comprising a connection or class of connections, responsive to one or more of the indicator of the desired class of service, the indicator of the desired sub-class of service, and the one or more content identifiers, wherein the first content is selected from the group consisting of domain name information and URL path information, and the second content is selected from the group consisting of cookie information and SSL session information.

25. The method of claim 24 wherein the resource is allocated to the resource request through application of a load balancing policy.

26. The method of claim 25 wherein the load balancing policy is determined responsive to the indicator of the desired sub-class of service for the resource request.

27. The method of claim 24 wherein the resource is allocated to the resource request through application of a persistence policy.

28. The method of claim 27 wherein the resource that is allocated is identified by the one or more content identifiers.

29. The method of claim 27 wherein the resource that is allocated is associated with a connection that is identified by the one or more content identifiers.

30. The method of claim 27 wherein the resource that is allocated is located responsive to the indicator of the desired sub-class of service and the one or more content identifiers.

31. The method of claim 30 wherein the resource that is allocated is located through an access to a hierarchical arrangement of data structures.

32. The method as in any one of claim 24 wherein the resource is a server.

33. The method as in any one of claims 1, 22, and 24 wherein the resource request is embodied as a data grouping.

34. The method of claim 33 wherein the data grouping is an http header.

35. The method of claim 33 wherein the data grouping is an https header.

36. The method as in any one of claims 1, 22, and 24 operation using a key derived from one or more non-content, header fields of the packet, the one wherein the indicator of the desired class of service is derived by performing a table lookup or more non-content, header fields of the packet comprising destination IP address, destination port, and protocol.

37. The method as in any one of claims 1, 22, and 24 wherein the one or more processor devices comprise one or more hardware processor devices, one or more processors executing software, or any combination of the foregoing.

38. The method of claim 37 wherein the one or more hardware processor devices comprise one or more finite state machines.

39. The method of claim 38 wherein the one or more finite state machines are implemented as one or more application specific integrated circuits (ASICs).

40. The method according to claim 22 or 24 wherein, when the second content is cookie information, an identifier of a server for allocation to the request is derived by processing the cookie information in accordance with a cookie processing mode determined responsive to the indicator of the desired category of service.

41. The method of claim 40 wherein the cookie processing mode is selected from the group consisting of self-identification cookie mode, directive hash mode, and cookie learning mode.

42. A system for determining an indicator of a desired sub-class of service for resource requests comprising:
one or more processor devices that receive the resource requests having one resource request corresponding to an OSI layer 4 and another resource request corresponding to an OSI layer 5 or higher, wherein the resource requests are embodied as or spawned by a packet, and which is accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have a tokenizer and an association engine refrain from performing content analysis processing of the resource request, and, when the indicator of the desired class of service indicates the desired class of service is at a layer in an applicable reference model corresponding to the OSI layer 5 or higher, have the tokenizer and the association engine perform content analysis processing of the resource request;
wherein the tokenizer, when performing content analysis processing of the resource request, is configured to parse content of the resource request, the content comprising at least a portion of the packet, or a segment encapsulating the packet, at a layer in an applicable reference model corresponding to the OSI layer 5 or higher;
a database configured to associate sub-classes of service with values of a key; and
the association engine, when performing content analysis processing of the resource request, is configured to:
assemble a key from either or both the indicator of the desired class of service and one or more of the tokens,
access the database using the key, obtains one or more entries therefrom that match the key, and
derive the indicator of the desired sub-class of service from the one or more matching entries, wherein each of a plurality of the entries indicates both type of match and action to be taken upon the type of match occurring, the type of match selected from the group consisting of an exact match, and at least one wildcard match, and the action to be taken upon the type of match occurring selected from the group consisting of stop searching and continue searching, and outputs the indicator of the desired sub-class of service,
wherein, the resource request comprises an https header, and the key from the resource request having the https header is derived solely from the indicator of the desired class of service, and the system further comprises a session engine configured to extract a SSL identifier string from the https header for allocating a resource to the resource request when performing content analysis processing of the resource request.

43. The system of claim 42 wherein the association engine is configured to obtain one or more database entries that represent exact matches with the key.

44. The system of claim 42 wherein the association engine is configured to obtain one or more database entries that represent wildcard matches with the key.

45. The system of claim 44 wherein the association engine is configured to obtain one or more database entries that represent wildcard prefix matches with the key.

46. The system of claim 44 wherein the association engine is configured to obtain one or more database entries that represent wildcard suffix matches with the key.

47. The system of claim 44 wherein the association engine is configured to select one of a plurality of matching database entries through application of a policy, and derive the indicator of the desired sub-class of service from the selected entry.

48. The system of claim 42 wherein the association engine is configured to access the database and locate matching entries iteratively using sub-keys derived from tokens parsed from the resource request.

49. The system of claim 42 wherein the database is embodied as one or more prefix tables for associating prefix sub-keys with identifiers of sub-classes of service, and one or more suffix tables for associating suffix sub-keys with identifiers of sub-classes of service.

50. The system of claim 42 wherein the tokenizer is configured to parse the resource request into tokens, and translate the tokens into uniformly sized codes.

51. The system of claim 50 wherein the tokenizer is configured to translate only those tokens that have matching entries in a database associating selected tokens with the codes.

52. The system of claim 51 wherein the selected tokens are determined from a configuration table identifying logical groupings of resources.

53. The system of claim 42 wherein the key comprises one or more header tags.

54. The system of claim 53 wherein the one or more header tags comprise one or more http header tags.

55. The system of claim 54 wherein the one or more http header tags comprise either or both a domain name and a URL pathname.

56. A system for deriving an indicator of a desired sub-class of service for, and one or more content identifiers from, resource requests comprising:
one or more processor devices configured to receive the resource requests having one resource request corresponding to OSI layer 4 and another resource request corresponding to OSI layer 5 or higher, wherein the resource requests are embodied as or spawned by a packet, and which are accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have an association engine and one or more extraction engines refrain from performing content analysis processing of the resource request, and, when the indicator of the desired class of service indicates the desired class of service is at a layer in an applicable reference model corresponding to the OSI layer 5 or higher, have the association engine and the one or more extraction engines perform content analysis processing of the resource request;
wherein the association engine, when performing content analysis processing of the resource request, configured to determine the indicator of the desired sub-class of service for the resource request, by matching content of a first portion of the resource request with one or more entries of a database associating match values of content with indicators of a desired sub-class of service, the content of the first portion comprising at least a portion of the packet, or a segment encapsulating the packet, at a layer in an applicable reference model corresponding to the OSI layer 5 or higher, wherein each of a plurality of the entries in the database indicates both type of match and action to be taken upon the type of match occurring, the type of match selected from the group consisting of an exact match, and at least one wildcard match, and the action to be taken upon the type of match occurring selected from the group consisting of stop searching and continue searching;
the one or more extraction engines, when performing content analysis processing of the resource request, configured to extract information from a second portion of the resource request distinct from the first portion at least in part, the second portion of the resource request comprising at least a portion of the packet, or a segment encapsulating the packet, at a layer in an applicable reference model corresponding to the OSI layer 5 or higher, and configured to derive the one or more content identifiers from the extracted information; and
wherein the one or both the indicators of the desired sub-class of service and the one or more content identifiers are for allocating a resource, comprising a connection or class of connections, to the resource request, and
wherein the second portion of the resource request is selected from the group consisting of cookie information and SSL session information.

57. The system of claim 56 wherein the association engine and the one or more extraction engines are configured to operate in parallel.

58. The system of claim 56 wherein the one or more content identifiers are useful for allocating a resource to the resource request based on application of a persistence policy.

59. The system of claim 56 wherein the indicator of the desired sub-class of service is use for allocating a resource to the resource request based on application of a load balancing policy.

60. A system for allocating resources to resource requests comprising:
one or more processor devices that receive the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have an association engine and one or more extraction engines configured to refrain from performing content analysis processing of the resource request, and, when the indicator of the desired class of service indicates the desired class of service is at a layer in an applicable reference model corresponding to the OSI layer 5 or higher, have either or both the association engine and one or more extraction engines perform content analysis processing of the resource request;
wherein the association engine, when performing content analysis processing of the resource request, and the resource request comprises an http header, is configured to determine the indicator of the desired sub-class of service for the resource request by matching content of a first portion of the resource request with one or more entries of a database that associate content portions with indicators of a desired sub-class of service, the content of the first portion comprising at least a portion of the packet, or a segment encapsulating the packet, at a layer in an applicable reference model corresponding to the OSI layer 5 or higher, wherein each of a plurality of the entries in the database indicates both type of match and action to be taken upon the type of match occurring, the type of match selected from the group consisting of an exact match, a prefix match, a suffix match, and a combination prefix and suffix match, and the action to be taken upon the type of match occurring selected from the group consisting of stop searching, continue searching, continue searching left-to-right, and continue searching right-to-left; and wherein the one or more extraction engines, when performing content analysis processing of the resource request, and the resource request comprises either an http or https header, configured to extract information from a second portion of the resource request distinct from the first at least in part, the second portion of the resource request comprising at least a portion of the packet, or a segment encapsulating the packet, at a layer in an applicable reference model corresponding to the OSI layer 5 or higher, and derives therefrom the one or more content identifiers;

a register including one or more programmable control bits configured to allow the association engine, and any of the one or more extraction engines, to be disabled or bypassed; and a policy engine configured to allocate a resource, comprising a connection or a class of connections, to the resource request responsive to one or more of the indicators of the desired class of service, the indicators of the desired sub-class of service and one or more content identifiers, wherein the second portion of the resource request is selected from the group consisting of cookie information and SSL session information.

61. The system of claim 60 wherein the one or more content identifiers comprise cookie information.

62. The system of claim 60 wherein the one or more content identifiers comprise session information.

63. The system of claim 60 wherein the one or more content identifiers are used for allocating a resource to the resource request based on application of a persistence policy.

64. The system of claim 60 wherein the indicator of the desired category of service is used for allocating a resource to the resource request based on application of a load balancing policy.

65. The system of claim 60 wherein the desired sub-class of service is used in combination with the one or more content identifiers for allocating a resource to the resource request based on application of a persistence policy.

66. A system for allocating resources to resource requests comprising:

one or more processor devices configured to receive the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have a means for determining and a means for extracting configured to refrain from performing content analysis processing of the resource request, and, when the indicator of the desired class of service indicates the desired class of service is at a layer in an applicable reference model corresponding to the OSI layer 5 or higher, have the means for determining and the means for extracting perform content analysis processing of the resource request;

the means for determining, when performing content analysis processing of the resource request, configured to determine the indicator of the desired sub-class of service for the resource request by matching content of a first portion of the resource request with one or more entries of a database associating match portions of content with indicators of a desired sub-class of service, first content comprising at least a portion of the packet, or a segment encapsulating the packet, at a layer in an applicable reference model corresponding to the OSI layer 5 or higher, wherein each of a plurality of entries in the database indicates both type of match and action to be taken upon the type of match occurring, the type of match selected from the group consisting of an exact match, and at least one wildcard match, and the action to be taken upon the type of match occurring selected from the group consisting of stop searching and continue searching;

the means for extracting, when performing content analysis processing of the resource request, configured to extract information from a second portion of the resource request distinct from the first at least in part, the second portion of the resource request comprising at least a portion of the packet, or a segment encapsulating the packet, at a layer in an applicable reference model corresponding to the OSI layer 5 or higher, and configured to derive therefrom one or more content identifiers, wherein the one or more content identifiers for application of one or more persistence policies;

means for allowing any of the determining means and the extracting means to be disabled or bypassed; and means for allocating a resource, comprising a connection or class of connections, to the resource request responsive to one or more of the indicator of the desired class of service, the indicator of the desired sub-class of service and the one or more content identifiers, wherein the second portion of the resource request is selected from the group consisting of cookie information and SSL session information.

67. The system as in any one of claims 42, 56, 60, and 66, wherein the resource request is embodied as a data grouping.

68. The system of claim 67 wherein the data grouping is an http header.

69. The system of claim 67 wherein the data grouping is an https header.

70. The system as in any one of claims 60 and 66 wherein the resource is a server.

71. The system as in any one of claims 42, 56, 60 and 66, wherein the one or more processor devices comprise one or more hardware processor devices, one or more processors executing software, or any combination of the foregoing.

72. The system of claim 71 wherein the one or more hardware processor devices comprise one or more finite state machines.

73. The system of claim 72 wherein the one or more finite state machines are implemented as one or more application specific integrated circuits (ASICs).

74. The system as in any one of claims 42, 56, 60 and 66 wherein the indicator of the desired class of service is derived by performing a table lookup operation using a key derived from one or more non-content, header fields of the packet, the one or more non-content, header fields of the packet comprising destination IP address, destination port, and protocol.

75. The system according to claim 56, 60 or 66 wherein, when the second portion of the resource request is cookie information, an identifier of a server for allocation to the request is derived by processing the cookie information in accordance with a cookie processing mode determined responsive to the indicator of the desired category of service.

76. The system of claim 75 wherein the cookie processing mode is selected from the group consisting of self-identification cookie mode, directive hash mode, and cookie learning mode.

77. A system for deriving an indicator of a desired sub-class of service for, and one or more content identifiers from, resource requests comprising:
one or more processor devices that receive the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have an association engine and one or more extraction engines refrain from performing content analysis processing of the resource request, and, when the indicator of the desired class of service indicates the desired class of service is at a layer in an applicable reference model corresponding to the OSI layer 5 or higher, have the association engine and one or more extraction engines perform content analysis processing of the resource request;
wherein the association engine, when performing content analysis processing of the resource request, configured to determine the indicator of the desired sub-class of service for the resource request, by matching content of a first portion of the resource request with one or more entries of a database associating match values of content with indicators of a desired sub-class of service, the content of the first portion comprising at least a portion of the packet, or a segment encapsulating the packet, at a layer in an applicable reference model corresponding to the OSI layer 5 or higher, wherein each of a plurality of the entries in the database indicates both type of match and action to be taken upon the type of match occurring, the type of match selected from the group consisting of an exact match, and at least one wildcard match, and the action to be taken upon the type of match occurring selected from the group consisting of stop searching and continue searching;
the one or more extraction engines, when performing content analysis processing of the resource request, configured to extract information from a second portion of the resource request distinct from the first portion at least in part, the second portion of the resource request comprising at least a portion of the packet, or a segment encapsulating the packet, at a layer in an applicable reference model corresponding to the OSI layer 5 or higher, and configured to derive the one or more content identifiers from the extracted information; and
wherein the one or both the indicators of the desired sub-class of service and the one or more content identifiers are for allocating a resource, comprising a connection or class of connections, to the resource request,
wherein the one or more extraction engines comprise a cookie engine and a session engine, and the system further comprises a control logic configured to:
disable or bypass the session engine in response to receiving resources requests having an http header, and
disable or bypass the association engine and the cookie engine in response to receiving resource requests having an https header.

78. A system for allocating resources to a resource requests comprising:
one or more processor devices that receive the resource requests having one resource request corresponding to an OSI layer 4 and another resource request corresponding to an OSI layer 5 or higher, wherein the resource requests are embodied as or spawned by a packet, and which are accompanied by or associated with an indicator of a desired class of service for the request derived from one or more non-content, header fields of the packet, and, when the indicator of the desired class of service indicates the desired class of service is at a layer in an applicable reference model corresponding to the OSI layer 4, have an association engines and one or more extraction engines refrain from performing content analysis processing of the resource request, and, when the indicator of the desired class of service indicates the desired class of service is at a layer in an applicable reference model corresponding to the OSI layer 5 or higher, have either or both the association engine and one or more extraction engines perform content analysis processing of the resource request;
wherein the association engine, when performing content analysis processing of the resource request, and the resource request comprises an http header, configured to determine the indicator of the desired sub-class of service for the resource request by matching content of a first portion of the resource request with one or more entries of a database that associate content portions with indicators of a desired sub-class of service, the content of the first portion comprising at least a portion of the packet, or a segment encapsulating the packet, at a layer in an applicable reference model corresponding to OSI layer five or higher, wherein each of a plurality of the entries in the database indicates both type of match and action to be taken upon the type of match occurring, the type of match selected from the group consisting of an exact match, a prefix match, a suffix match, and a combination prefix and suffix match, and the action to be taken upon the type of match occurring selected from the group consisting of stop searching, continue searching, continue searching left-to-right, and continue searching right-to-left; and
the one or more extraction engines, when performing content analysis processing of the resource request, and the resource request comprises either an http or https header, configured to extract information from a second portion of the resource request distinct from the first at least in part, the second portion of the resource request comprising at least a portion of the packet, or a segment encapsulating the packet, at a layer in an applicable reference model corresponding to the OSI layer 5 or higher, and to derive therefrom the one or more content identifiers;

a register including one or more programmable control bits configured to allow the association engine, and any of the one or more extraction engines, to be disabled or bypassed; and a policy engine configured to allocate a resource, comprising a connection or class of connections, to the resource request responsive to one or more of the indicator of the desired class of service, the indicator of the desired sub-class of service and the one or more content identifiers, wherein the one or more extraction engines comprise a cookie engine and a session engine, and the control register configured to:

disable or bypass the session engine in response to receiving resources requests having an http header, and disable or bypass the association engine and the cookie engine in response to receiving resource requests having an https header.

* * * * *